(12) United States Patent
Wang et al.

(10) Patent No.: US 11,782,920 B1
(45) Date of Patent: Oct. 10, 2023

(54) DURABLE SEARCH QUERIES FOR RELIABLE DISTRIBUTED DATA RETRIEVAL

(71) Applicant: Splunk Inc., San Francisco, CA (US)

(72) Inventors: Phil Yonghui Wang, Sunnyvale, CA (US); Steve Zhang, San Francisco, CA (US)

(73) Assignee: SPLUNK INC., San Francisco, CA (US)

( * ) Notice: Subject to any disclaimer, the term of this patent is extended or adjusted under 35 U.S.C. 154(b) by 336 days.

(21) Appl. No.: 17/163,118

(22) Filed: Jan. 29, 2021

(51) Int. Cl.
*G06F 16/24* (2019.01)
*G06F 16/245* (2019.01)
*G06F 16/2453* (2019.01)
*G06F 16/2458* (2019.01)

(52) U.S. Cl.
CPC .... *G06F 16/24535* (2019.01); *G06F 16/2477* (2019.01); *G06F 16/24542* (2019.01)

(58) Field of Classification Search
None
See application file for complete search history.

(56) References Cited

U.S. PATENT DOCUMENTS

| | | | |
|---|---|---|---|
| 7,937,344 B2 | 5/2011 | Baum et al. | |
| 8,112,425 B2 | 2/2012 | Baum et al. | |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 10,037,346 B1* | 7/2018 | Hsieh | G06F 16/20 |
| 10,127,258 B2 | 11/2018 | Lamas et al. | |
| 2002/0087564 A1* | 7/2002 | Khanna | G06F 16/9027 |
| 2016/0147830 A1* | 5/2016 | Zhong | G06F 16/24565 707/769 |
| 2017/0177697 A1* | 6/2017 | Lee | G06F 16/2365 |
| 2019/0098106 A1 | 3/2019 | Mungel et al. | |
| 2019/0310977 A1* | 10/2019 | Pal | G06F 16/2455 |
| 2021/0064594 A1* | 3/2021 | Dageville | G06F 16/2365 |

OTHER PUBLICATIONS

Splunk Enterprise 8.0.0 Overview, available online, retrieved May 20, 2020 from docs.splunk.com.
(Continued)

*Primary Examiner* — Son T Hoang
(74) *Attorney, Agent, or Firm* — Artegis Law Group, LLP

(57) ABSTRACT

A data intake and query system executes a search query at a first execution time for querying events having associated time stamps within a first time period characterized by a first start time and a first end time. The first start time is computed based upon a time indicated by reference time information stored prior to execution of the search query. The system determines whether execution of the search query completed successfully based upon a first search result obtained from executing the search query. If the first execution of the search query was not successful, the system computes for a second execution of the search query after the first execution, a second time period using the reference time information. The second execution is configured to query events with associated timestamps that fall within a second time period that includes the first time period and an additional time period.

20 Claims, 13 Drawing Sheets

(56) References Cited

OTHER PUBLICATIONS

Splunk Cloud 8.0.2004 User Manual, available online, retrieved May 20, 2020 from docs.splunk.com.
Splunk Quick Reference Guide, updated 2019, available online at https://www.splunk.com/pds/solution-guides/splunk-quick-reference-guide.pdf, retrieved May 20, 2020.
Carraso, David, "Exploring Splunk," published by CITO Research, New York, NY, Apr. 2012.
Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

* cited by examiner

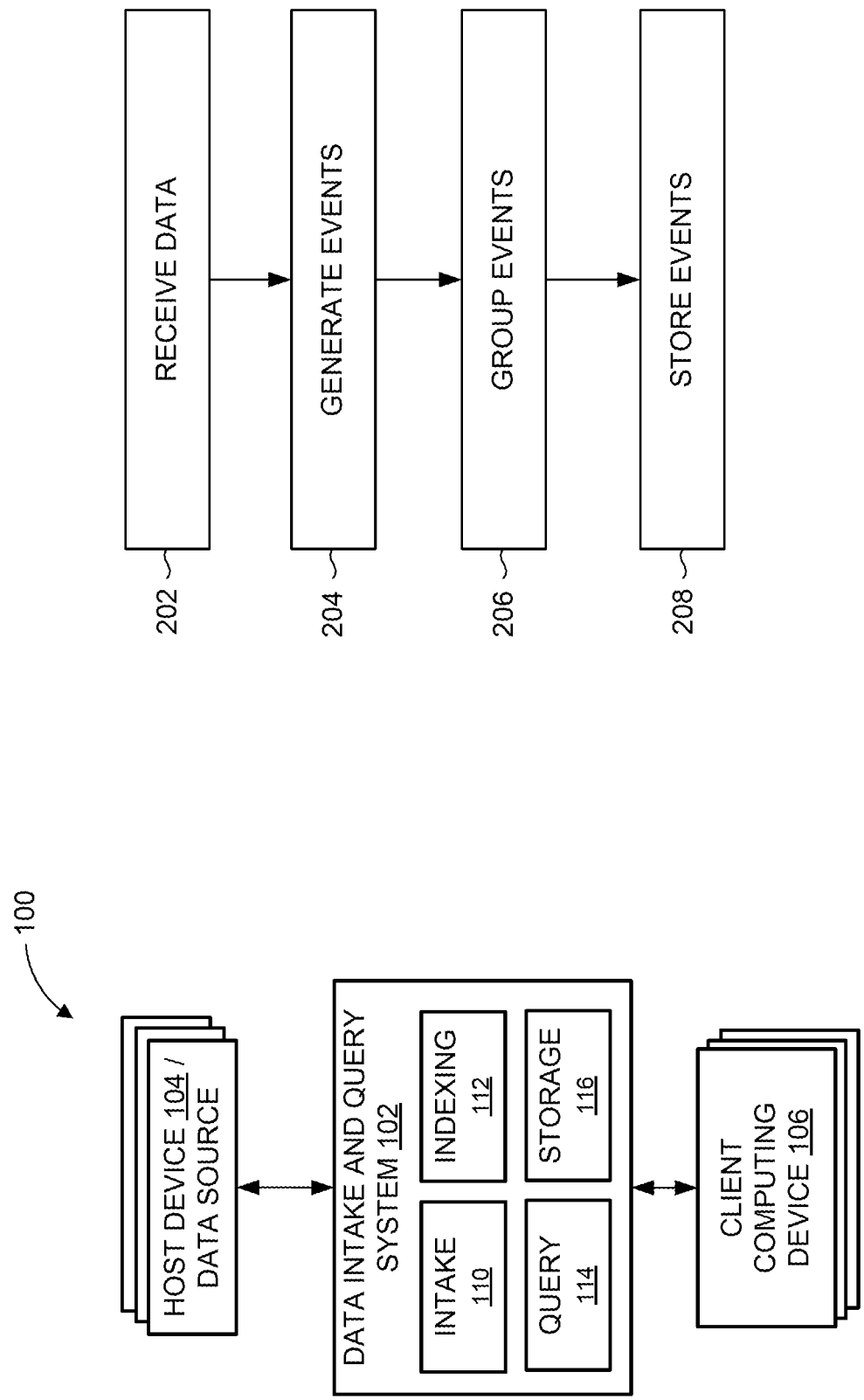

― 302

― 302A 127.0.0.1 – eva [10/Oct/2000:13:55:36-0700] "GET/apache.gif HTTP/1.0" 200 2326 0.0947
127.0.0.1 – emerson [10/Oct/2000:13:56:36-0700] "GET/eastwood.gif HTTP/1.0" 200 2980 0.0899

― 302C   ― 302B 127.0.0.3 – eliza [10/Oct/2000:13:57:36-0700] "GET/ezra.gif HTTP/1.0" 200 2900 0.0857
[Sunday Oct 10 1:58:33 2010] [error] [client 127.10.1.1.015] File does not exist: /home/emmeline/pub_html/images/alisia.gif

― 302E   ― 302D 91.205.189.15 - - [28/Apr/2014:18:22:16] *GET /oldlink?itemId=EST-14&JSESSIONID=SD6SL7FF7ADFF53113 HTTP 1.1" 200 1665 "http://www.buttercupgames.com/oldlink?itemId=EST-14" "Mozilla/5.0 (Windwos NT 6.1; WOW 64) AppleWebKit/536.5 (KHTML, like Gecko) Chrome/19.0.1084.46 Safari/536.5" 159

― 304 docker: {
    container_id: f7360a148a670c4c257f4ee024be81284b6017d72ae41ea8ee5d
}
kubernetes: {                                    ― 304A
    container_name: kube-apiserver
    host: ip-172-20-43-173.ec2.internal
    labels: {
      k8s-app: kube-apiserver
    }
master_url: https://100.64.0.1:443/api
namespace_id: e5af26aa-4ef9-11e8-a4e1-0a2bf2ab4bba
namespace_name: kube-system
pod_id: 0a73017b-4efa-11e8-a4e1-0a2bf2ab4bba
pod_name: kube-apiserver-ip-172-20-43-173.ec2.internal     ― 304B
}
log: I0503 23:04:12.595203     1 wrap.go:42] GET /apis/admissionregistrations.k8s.io/v1beta1/validatingwebhookconfiguration 200 [[kube-apiserver/v1.9.3 (linux/amd64) kubernetes/d283541] 127.0.0.1:55026 stream: stdout
time: 2018-05-03T23:04:12.619948395Z
}

― 306

| time | ID | CPU | memory |
|---|---|---|---|
| 10/10/00 12:01:00.013 | eliza | 14% | 80% |
| 10/10/00 12:01:05.153 | eva | 26% | 70% |

FIG. 3A

Create/Edit Search Query UI

800

✕

Title 802: Durable Job A

Description 804: A durable search job is part of saved search, and used for reports and alerts.

Search 806: index=_internal source="«metrics.log" kb!=NULL max_age>0 | stats sum (kb) AS total_volume, sum(ev) as total_events by group, series, max_age Earliest time 808: -10m@m Time specifiers: y, mon, d, h, m, s Learn More

Latest time 810: now

Time specifiers: y, mon, d, h, m, s Learn More

Durable Search 812: ✕

Track Time Type 814: Indexed Timestamp | Event Timestamp

Track Time Lag 816: 10

Backfill Type 818: Auto | Whole Time | Cron Interval

Max Backfill Intervals 820: 100

Cancel  Save

FIG. 8

DURABLE SEARCH QUERIES FOR RELIABLE DISTRIBUTED DATA RETRIEVAL

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include log data, performance data, diagnostic data, metrics, tracing data, or any other data that can be analyzed to diagnose equipment performance problems, monitor user interactions, and to derive other insights.

The large amount and diversity of data systems containing large amounts of structured, semi-structured, and unstructured data relevant to any search query can be massive, and continues to grow rapidly. This technological evolution can give rise to various challenges in relation to managing, understanding and effectively utilizing the data. To reduce the potentially vast amount of data that may be generated, some data systems pre-process data based on anticipated data analysis needs. In particular, specified data items may be extracted from the generated data and stored in a data system to facilitate efficient retrieval and analysis of those data items at a later time. At least some of the remainder of the generated data is typically discarded during pre-processing.

However, storing massive quantities of minimally processed or unprocessed data (collectively and individually referred to as "raw data") for later retrieval and analysis is becoming increasingly more feasible as storage capacity becomes more inexpensive and plentiful. In general, storing raw data and performing analysis on that data later can provide greater flexibility because it enables an analyst to analyze all of the generated data instead of only a fraction of it. Although the availability of vastly greater amounts of diverse data on diverse data systems provides opportunities to derive new insights, it also gives rise to technical challenges to search and analyze the data in a performant way.

BRIEF DESCRIPTION OF THE DRAWINGS

Illustrative examples are described in detail below with reference to the following figures:

FIG. 1 is a block diagram of an embodiment of a data processing environment.

FIG. 2 is a flow diagram illustrating an embodiment of a routine implemented by the data intake and query system to process, index, and store data.

FIG. 3A is a block diagram illustrating an embodiment of machine data received by the data intake and query system.

FIG. 8 illustrates an example of a graphical user interface (GUI) that the data intake and query system may provide to enable users to configure a search job.

DETAILED DESCRIPTION

Figure 3B:
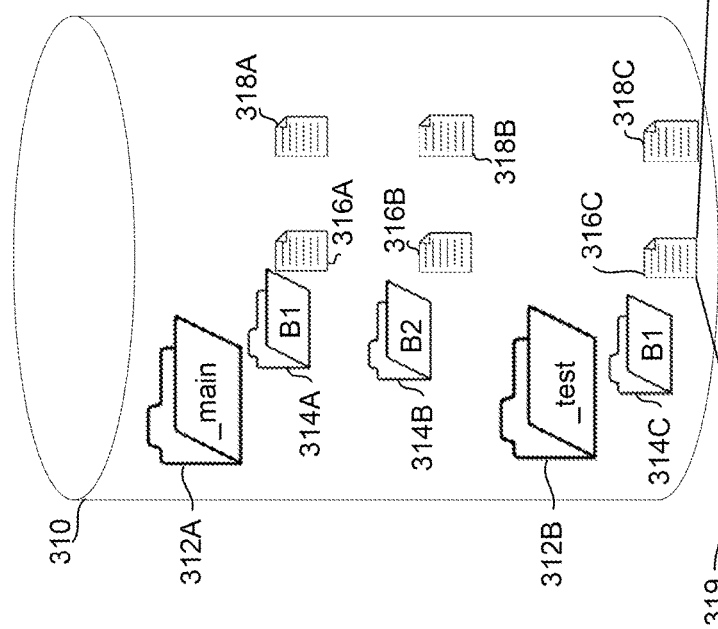
FIGS. 3B and 3C are block diagrams illustrating embodiments of various data structures for storing data processed by the data intake and query system.

Modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment and that reflects activity in the IT environment. For example, machine data can be raw machine data that is generated by various components in IT environments, such as servers, sensors, routers, mobile devices, Internet of Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of tools are available to analyze machine data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that concurrently report these types of information.

These challenges can be addressed by using an event-based data intake and query system, such as the SPLUNK® ENTERPRISE, SPLUNK® CLOUD, or SPLUNK® CLOUD SERVICE system developed by Splunk Inc. of San Francisco, Calif. These systems represent the leading platform for providing real-time operational intelligence that enables organizations to collect, index, and search machine data from various websites, applications, servers, networks, and mobile devices that power their businesses. The data intake and query system is particularly useful for analyzing data which is commonly found in system log files, network data, metrics data, tracing data, and other data input sources.

In the data intake and query system, machine data is collected and stored as "events." An event comprises a portion of machine data and is associated with a specific point in time. The portion of machine data may reflect activity in an IT environment and may be produced by a component of that IT environment, where the events may be searched to provide insight into the IT environment, thereby improving the performance of components in the IT environment. Events may be derived from "time series data," where the time series data comprises a sequence of data points (e.g., performance measurements from a computer system, etc.) that are associated with successive points in time. In general, each event has a portion of machine data that is associated with a timestamp. The time stamp may be derived from the portion of machine data in the event, determined through interpolation between temporally proximate events having known timestamps, and/or may be determined based on other configurable rules for associating timestamps with events.

In some instances, machine data can have a predefined structure, where data items with specific data formats are stored at predefined locations in the data. For example, the machine data may include data associated with fields in a database table. In other instances, machine data may not have a predefined structure (e.g., may not be at fixed, predefined locations), but may have repeatable (e.g., non-random) patterns. This means that some machine data can comprise various data items of different data types that may be stored at different locations within the data. For example, when the data source is an operating system log, an event can include one or more lines from the operating system log containing machine data that includes different types of performance and diagnostic information associated with a specific point in time (e.g., a timestamp).

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The machine data generated by such data sources can include, for example and without limitation, server log files, activity log files, configuration files, messages, network packet data, performance measurements, sensor measurements, etc.

The data intake and query system can use flexible schema to specify how to extract information from events. A flexible schema may be developed and redefined as needed. The flexible schema can be applied to events "on the fly," when it is needed (e.g., at search time, index time, ingestion time, etc.). When the schema is not applied to events until search time, the schema may be referred to as a "late-binding schema."

During operation, the data intake and query system receives machine data from any type and number of sources (e.g., one or more system logs, streams of network packet data, sensor data, application program data, error logs, stack traces, system performance data, etc.). The system parses the machine data to produce events each having a portion of machine data associated with a timestamp, and stores the events. The system enables users to run queries against the stored events to, for example, retrieve events that meet filter criteria specified in a query, such as criteria indicating certain keywords or having specific values in defined fields. Additional query terms can further process the event data, such as, by transforming the data, etc.

As used herein, the term "field" can refer to a location in the machine data of an event containing one or more values for a specific data item. A field may be referenced by a field name associated with the field. As will be described in more detail herein, in some cases, a field is defined by an extraction rule (e.g., a regular expression) that derives one or more values or a sub-portion of text from the portion of machine data in each event to produce a value for the field for that event. The set of values produced are semantically-related (such as IP address), even though the machine data in each event may be in different formats (e.g., semantically-related values may be in different positions in the events derived from different sources).

As described above, the system stores the events in a data store. The events stored in the data store are field-searchable, where field-searchable herein refers to the ability to search the machine data (e.g., the raw machine data) of an event based on a field specified in search criteria. For example, a search having criteria that specifies a field name "UserID" may cause the system to field-search the machine data of events to identify events that have the field name "UserID." In another example, a search having criteria that specifies a field name "UserID" with a corresponding field value "12345" may cause the system to field-search the machine data of events to identify events having that field-value pair (e.g., field name "UserID" with a corresponding field value of "12345"). Events are field-searchable using one or more configuration files associated with the events. Each configuration file can include one or more field names, where each field name is associated with a corresponding extraction rule and a set of events to which that extraction rule applies. The set of events to which an extraction rule applies may be identified by metadata associated with the set of events. For example, an extraction rule may apply to a set of events that are each associated with a particular host, source, or source-type. When events are to be searched based on a particular field name specified in a search, the system can use one or more configuration files to determine whether there is an extraction rule for that particular field name that applies to each event that falls within the criteria of the search. If so, the event is considered as part of the search results (and additional processing may be performed on that event based on criteria specified in the search). If not, the next event is similarly analyzed, and so on.

As noted above, the data intake and query system can utilize a late-binding schema while performing queries on events. One aspect of a late-binding schema is applying extraction rules to events to extract values for specific fields during search time. More specifically, the extraction rule for a field can include one or more instructions that specify how to extract a value for the field from an event. An extraction rule can generally include any type of instruction for extracting values from machine data or events. In some cases, an extraction rule comprises a regular expression, where a sequence of characters form a search pattern. An extraction rule comprising a regular expression is referred to herein as a regex rule. The system applies a regex rule to machine data or an event to extract values for a field associated with the regex rule, where the values are extracted by searching the machine data/event for the sequence of characters defined in the regex rule.

In the data intake and query system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields specified in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the data intake and query system maintains the underlying machine data and uses a late-binding schema for searching the machine data, it enables a user to continue investigating and learn valuable insights about the machine data.

In some embodiments, a common field name may be used to reference two or more fields containing equivalent and/or similar data items, even though the fields may be associated with different types of events that possibly have different data formats and different extraction rules. By enabling a common field name to be used to identify equivalent and/or similar fields from different types of events generated by disparate data sources, the system facilitates use of a "common information model" (CIM) across the disparate data sources.

In some embodiments, the configuration files and/or extraction rules described above can be stored in a catalog, such as a metadata catalog. In certain embodiments, the content of the extraction rules can be stored as rules or actions in the metadata catalog. For example, the identification of the data to which the extraction rule applies can be referred to a rule and the processing of the data can be referred to as an action.

1.0. Operating Environment

FIG. 1 is a block diagram of an embodiment of a data processing environment 100. In the illustrated embodiment, the environment 100 includes a data intake and query system 102, one or more host devices 104, and one or more client computing devices 106 (generically referred to as client device(s) 106).

The data intake and query system 102, host devices 104, and client devices 106 can communicate with each other via one or more networks, such as a local area network (LAN), wide area network (WAN), private or personal network, cellular networks, intranetworks, and/or internetworks using any of wired, wireless, terrestrial microwave, satellite links, etc., and may include the Internet. Although not explicitly shown in FIG. 1, it will be understood that a client computing device 106 can communicate with a host device 104 via one or more networks. For example, if the host device 104 is configured as a web server and the client computing device 106 is a laptop, the laptop can communicate with the web server to view a website.

A client device 106 can correspond to a distinct computing device that can configure, manage, or sends queries to the system 102. Examples of client devices 106 may include, without limitation, smart phones, tablet computers, handheld computers, wearable devices, laptop computers, desktop computers, servers, portable media players, gaming devices, or other device that includes computer hardware (e.g., processors, non-transitory, computer-readable media, etc.) and so forth. In certain cases, a client device 106 can include a hosted, virtualized, or containerized device, such as an isolated execution environment, that shares computing resources (e.g., processor, memory, etc.) of a particular machine with other isolated execution environments.

The client devices 106 can interact with the system 102 (or a host device 104) in a variety of ways. For example, the client devices 106 can communicate with the system 102 (or a host device 104) over an Internet (Web) protocol, via a gateway, via a command line interface, via a software developer kit (SDK), a standalone application, etc. As another example, the client devices 106 can use one or more executable applications or programs to interface with the system 102.

A host device 104 can correspond to a distinct computing device or system that includes or has access to data that can be ingested, indexed, and/or searched by the system 102. Accordingly, in some cases, a client device 106 may also be a host device 104 (e.g., it can include data that is ingested by the system 102 and it can submit queries to the system 102). The host devices 104 can include, but are not limited to, servers, sensors, routers, personal computers, mobile devices, internet of things (IOT) devices, or hosting devices, such as computing devices in a shared computing resource environment on which multiple isolated execution environment (e.g., virtual machines, containers, etc.) can be instantiated, or other computing devices in an IT environment (e.g., device that includes computer hardware, e.g., processors, non-transitory, computer-readable media, etc.). In certain cases, a host device 104 can include a hosted, virtualized, or containerized device, such as an isolated execution environment, that shares computing resources (e.g., processor, memory, etc.) of a particular machine (e.g., a hosting device or hosting machine) with other isolated execution environments.

As mentioned host devices 104 can include or have access to data sources for the system 102. The data sources can include machine data found in log files, data files, distributed file systems, streaming data, publication-subscribe (pub/sub) buffers, directories of files, data sent over a network, event logs, registries, streaming data services (examples of which can include, by way of non-limiting example, Amazon's Simple Queue Service ("SQS") or Kinesis™ services, devices executing Apache Kafka™ software, or devices implementing the Message Queue Telemetry Transport (MQTT) protocol, Microsoft Azure EventHub, Google Cloud Pub Sub, devices implementing the Java Message Service (JMS) protocol, devices implementing the Advanced Message Queuing Protocol (AMQP)), cloud-based services (e.g., AWS, Microsoft Azure, Google Cloud, etc.), operating-system-level virtualization environments (e.g., Docker), container orchestration systems (e.g., Kubernetes), virtual machines using full virtualization or paravirtualization, or other virtualization technique or isolated execution environments.

In some cases, one or more applications executing on a host device may generate various types of machine data during operation. For example, a web server application executing on a host device 104 may generate one or more web server logs detailing interactions between the web server and any number of client devices 106 or other devices. As another example, a host device 104 implemented as a router may generate one or more router logs that record information related to network traffic managed by the router. As yet another example, a database server application executing on a host device 104 may generate one or more logs that record information related to requests sent from other devices (e.g., web servers, application servers, client devices, etc.) for data managed by the database server. Similarly, a host device 104 may generate and/or store computing resource utilization metrics, such as, but not limited to, CPU utilization, memory utilization, number of processes being executed, etc. Any one or any combination of the files or data generated in such cases can be used as a data source for the system 102.

In some embodiments, an application may include a monitoring component that facilitates generating performance data related to host device's operating state, including monitoring network traffic sent and received from the host device and collecting other device and/or application-specific information. A monitoring component may be an integrated component of the application, a plug-in, an extension, or any other type of add-on component, or a stand-alone process.

Such monitored information may include, but is not limited to, network performance data (e.g., a URL requested, a connection type (e.g., HTTP, HTTPS, etc.), a connection start time, a connection end time, an HTTP status code, request length, response length, request headers, response headers, connection status (e.g., completion, response time(s), failure, etc.)) or device performance information (e.g., current wireless signal strength of the device, a current connection type and network carrier, current memory performance information, processor utilization, memory utilization, a geographic location of the device, a device orientation, and any other information related to the operational state of the host device, etc.), device profile information (e.g., a type of client device, a manufacturer, and model of the device, versions of various software applications installed on the device, etc.) In some cases, the monitoring component can collect device performance information by monitoring one or more host device operations, or by making calls to an operating system and/or one or more other applications executing on a host device for performance information. The monitored information may be stored in one or more files and/or streamed to the system 102.

In general, a monitoring component may be configured to generate performance data in response to a monitor trigger in the code of a client application or other triggering application event, as described above, and to store the performance data in one or more data records. Each data record, for example, may include a collection of field-value pairs, each field-value pair storing a particular item of performance data in association with a field for the item. For example, a data record generated by a monitoring component may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

In some embodiments, such as in a shared computing resource environment (or hosted environment), a host device 104 may include logs or machine data generated by an application executing within an isolated execution environment (e.g., web server log file if the isolated execution environment is configured as a web server or database server log files if the isolated execution environment is configured as database server, etc.), machine data associated with the computing resources assigned to the isolated execution environment (e.g., CPU utilization of the portion of the CPU allocated to the isolated execution environment, memory utilization of the portion of the memory allocated to the isolated execution environment, etc.), logs or machine data generated by an application that enables the isolated execution environment to share resources with other isolated execution environments (e.g., logs generated by a Docker manager or Kubernetes manager executing on the host device 104), and/or machine data generated by monitoring the computing resources of the host device 104 (e.g., CPU utilization, memory utilization, etc.) that are shared between the isolated execution environments. Given the separation (and isolation) between isolated execution environments executing on a common computing device, in certain embodiments, each isolated execution environment may be treated as a separate host device 104 even if they are, in fact, executing on the same computing device or hosting device.

Accordingly, as used herein, obtaining data from a data source may refer to communicating with a host device 104 to obtain data from the host device 104 (e.g., from one or more data source files, data streams, directories on the host device 104, etc.). For example, obtaining data from a data source may refer to requesting data from a host device 104 and/or receiving data from a host device 104. In some such cases, the host device 104 can retrieve and return the requested data from a particular data source and/or the system 102 can retrieve the data from a particular data source of the host device 104 (e.g., from a particular file stored on a host device 104).

The data intake and query system 102 can ingest, index, and/or store data from heterogeneous data sources and/or host devices 104. For example, the system 102 can ingest, index, and/or store any type of machine data, regardless of the form of the machine data or whether the machine data matches or is similar to other machine data ingested, indexed, and/or stored by the system 102. In some cases, the system 102 can generate events from the received data, group the events, and store the events in buckets. The system 102 can also search heterogeneous data that it has stored or search data stored by other systems (e.g., other system 102 systems or other non-system 102 systems). For example, in response to received queries, the system 102 can assign one or more components to search events stored in the storage system or search data stored elsewhere.

As will be described herein in greater detail below, the system 102 can use one or more components to ingest, index, store, and/or search data. In some embodiments, the system 102 is implemented as a distributed system that uses multiple components to perform its various functions. For example, the system 102 can include any one or any combination of an intake system 110 (including one or more components) to ingest data, an indexing system 112 (including one or more components) to index the data, a storage system 116 (including one or more components) to store the data, and/or a query system 114 (including one or more components) to search the data, etc.

In the illustrated embodiment, the system 102 is shown having four subsystems 110, 112, 114, 116. However, it will be understood that the system 102 may include any one or any combination of the intake system 110, indexing system 112, query system 114, or storage system 116. Further, in certain embodiments, one or more of the intake system 110, indexing system 112, query system 114, or storage system 116 may be used alone or apart from the system 102. For example, the intake system 110 may be used alone to glean information from streaming data that is not indexed or stored by the system 102, or the query system 114 may be used to search data that is unaffiliated with the system 102.

In certain embodiments, the components of the different systems may be distinct from each other or there may be some overlap. For example, one component of the system 102 may include some indexing functionality and some searching functionality and thus be used as part of the indexing system 112 and query system 114, while another computing device of the system 102 may only have ingesting or search functionality and only be used as part of those respective systems. Similarly, the components of the storage system 116 may include data stores of individual components of the indexing system and/or may be a separate shared data storage system, like Amazon S3, that is accessible to distinct components of the intake system 110, indexing system 112, and query system 114.

In some cases, the components of the system 102 are implemented as distinct computing devices having their own computer hardware (e.g., processors, non-transitory, computer-readable media, etc.) and/or as distinct hosted devices (e.g., isolated execution environments) that share computing resources or hardware in a shared computing resource environment.

For simplicity, references made herein to the intake system 110, indexing system 112, storage system 116, and query system 114 can refer to those components used for ingesting, indexing, storing, and searching, respectively. However, it will be understood that although reference is made to two separate systems, the same underlying component may be performing the functions for the two different systems. For example, reference to the indexing system indexing data and storing the data in the storage system 116 or the query system searching the data may refer to the same component (e.g., same computing device or hosted device) indexing the data, storing the data, and then searching the data that it stored.

As will be described in greater detail herein, the intake system 110 can receive data from the host devices 104 or data sources, perform one or more preliminary processing operations on the data, and communicate the data to the indexing system 112, query system 114, storage system 116, or to other systems (which may include, for example, data processing systems, telemetry systems, real-time analytics systems, data stores, databases, etc., any of which may be operated by an operator of the system 102 or a third party).

Given the amount of data that can be ingested by the intake system 110, in some embodiments, the intake system can include multiple distributed computing devices or components working concurrently to ingest the data.

The intake system 110 can receive data from the host devices 104 in a variety of formats or structures. In some embodiments, the received data corresponds to raw machine data, structured or unstructured data, correlation data, data files, directories of files, data sent over a network, event logs, registries, messages published to streaming data sources, performance metrics, sensor data, image and video data, etc.

The preliminary processing operations performed by the intake system 110 can include, but is not limited to, associating metadata with the data received from a host device 104, extracting a timestamp from the data, identifying individual events within the data, extracting a subset of machine data for transmittal to the indexing system 112, enriching the data, etc. As part of communicating the data to the indexing system, the intake system 110 can route the data to a particular component of the intake system 110 or dynamically route the data based on load-balancing, etc. In certain cases, one or more components of the intake system 110 can be installed on a host device 104.

1.4.2. Indexing System Overview

As will be described in greater detail herein, the indexing system 112 can include one or more components (e.g., indexing nodes) to process the data and store it, for example, in the storage system 116. As part of processing the data, the indexing system can identify distinct events within the data, timestamps associated with the data, organize the data into buckets or time series buckets, convert editable buckets to non-editable buckets, store copies of the buckets in the storage system 116, merge buckets, generate indexes of the data, etc. In addition, the indexing system 112 can update various catalogs or databases with information related to the buckets (pre-merged or merged) or data that is stored in the storage system 116, and can communicate with the intake system 110 about the status of the data storage.

As will be described in greater detail herein, the query system 114 can include one or more components to receive, process, and execute queries. In some cases, the query system 114 can use the same component to process and execute the query or use one or more components to receive and process the query (e.g., a search head) and use one or more other components to execute at least a portion of the query (e.g., search nodes). In some cases, a search node and an indexing node may refer to the same computing device or hosted device performing different functions. In certain cases, a search node can be a separate computing device or hosted device from an indexing node.

Queries received by the query system 114 can be relatively complex and identify a set of data to be processed and a manner of processing the set of data from one or more client devices 106. In certain cases, the query can be implemented using a pipelined command language or other query language. As described herein, in some cases, the query system 114 can execute parts of the query in a distributed fashion (e.g., one or more mapping phases or parts associated with identifying and gathering the set of data identified in the query) and execute other parts of the query on a single component (e.g., one or more reduction phases). However, it will be understood that in some cases multiple components can be used in the map and/or reduce functions of the query execution.

In some cases, as part of executing the query, the query system 114 can use one or more catalogs or databases to identify the set of data to be processed or its location in the storage system 116 and/or can retrieve data from the storage system 116. In addition, in some embodiments, the query system 114 can store some or all of the query results in the storage system 116.

In some cases, the storage system 116 may include one or more data stores associated with or coupled to the components of the indexing system 112 that are accessible via a system bus or local area network. In certain embodiments, the storage system 116 may be a shared storage system 116, like Amazon S3 or Google Cloud Storage, that are accessible via a wide area network.

As mentioned and as will be described in greater detail below, the storage system 116 can be made up of one or more data stores storing data that has been processed by the indexing system 112. In some cases, the storage system includes data stores of the components of the indexing system 112 and/or query system 114. In certain embodiments, the storage system 116 can be implemented as a shared storage system 116. The shared storage system 116 can be configured to provide high availability, highly resilient, low loss data storage. In some cases, to provide the high availability, highly resilient, low loss data storage, the shared storage system 116 can store multiple copies of the data in the same and different geographic locations and across different types of data stores (e.g., solid state, hard drive, tape, etc.). Further, as data is received at the shared storage system 116 it can be automatically replicated multiple times according to a replication factor to different data stores across the same and/or different geographic locations. In some embodiments, the shared storage system 116 can correspond to cloud storage, such as Amazon Simple Storage Service (S3) or Elastic Block Storage (EBS), Google Cloud Storage, Microsoft Azure Storage, etc.

In some embodiments, indexing system 112 can read to and write from the shared storage system 116. For example, the indexing system 112 can copy buckets of data from its local or shared data stores to the shared storage system 116. In certain embodiments, the query system 114 can read from, but cannot write to, the shared storage system 116. For example, the query system 114 can read the buckets of data stored in shared storage system 116 by the indexing system 112, but may not be able to copy buckets or other data to the shared storage system 116. In some embodiments, the intake system 110 does not have access to the shared storage system 116. However, in some embodiments, one or more components of the intake system 110 can write data to the shared storage system 116 that can be read by the indexing system 112.

As described herein, in some embodiments, data in the system 102 (e.g., in the data stores of the components of the indexing system 112, shared storage system 116, or search nodes of the query system 114) can be stored in one or more time series buckets. Each bucket can include raw machine data associated with a timestamp and additional information about the data or bucket, such as, but not limited to, one or more filters, indexes (e.g., TSIDX, inverted indexes, keyword indexes, etc.), bucket summaries, etc. In some embodiments, the bucket data and information about the bucket data is stored in one or more files. For example, the raw machine data, filters, indexes, bucket summaries, etc. can be stored in respective files in or associated with a bucket. In certain cases, the group of files can be associated together to form the bucket.

The system 102 can include additional components that interact with any one or any combination of the intake system 110, indexing system 112, query system 114, and/or storage system 116. Such components may include, but are not limited to an authentication system, orchestration system, one or more catalogs or databases, a gateway, etc.

An authentication system can include one or more components to authenticate users to access, use, and/or configure the system 102. Similarly, the authentication system can be used to restrict what a particular user can do on the system 102 and/or what components or data a user can access, etc.

An orchestration system can include one or more components to manage and/or monitor the various components of the system 102. In some embodiments, the orchestration system can monitor the components of the system 102 to detect when one or more components has failed or is unavailable and enable the system 102 to recover from the failure (e.g., by adding additional components, fixing the failed component, or having other components complete the tasks assigned to the failed component). In certain cases, the orchestration system can determine when to add components to or remove components from a particular system 110, 112, 114, 116 (e.g., based on usage, user/tenant requests, etc.). In embodiments where the system 102 is implemented in a shared computing resource environment, the orchestration system can facilitate the creation and/or destruction of isolated execution environments or instances of the components of the system 102, etc.

In certain embodiments, the system 102 can include various components that enable it to provide stateless services or enable it to recover from an unavailable or unresponsive component without data loss in a time efficient manner. For example, the system 102 can store contextual information about its various components in a distributed way such that if one of the components becomes unresponsive or unavailable, the system 102 can replace the unavailable component with a different component and provide the replacement component with the contextual information. In this way, the system 102 can quickly recover from an unresponsive or unavailable component while reducing or eliminating the loss of data that was being processed by the unavailable component.

In some embodiments, the system 102 can store the contextual information in a catalog, as described herein. In certain embodiments, the contextual information can correspond to information that the system 102 has determined or learned based on use. In some cases, the contextual information can be stored as annotations (manual annotations and/or system annotations), as described herein.

In certain embodiments, the system 102 can include an additional catalog that monitors the location and storage of data in the storage system 116 to facilitate efficient access of the data during search time. In certain embodiments, such a catalog may form part of the storage system 116.

In some embodiments, the system 102 can include a gateway or other mechanism to interact with external devices or to facilitate communications between components of the system 102. In some embodiments, the gateway can be implemented using an application programming interface (API). In certain embodiments, the gateway can be implemented using a representational state transfer API (REST API).

In some environments, a user of a system 102 may install and configure, on computing devices owned and operated by the user, one or more software applications that implement some or all of the components of the system 102. For example, with reference to FIG. 1, a user may install a software application on server computers owned by the user and configure each server to operate as one or more components of the intake system 110, indexing system 112, query system 114, shared storage system 116, or other components of the system 102. This arrangement generally may be referred to as an "on-premises" solution. That is, the system 102 is installed and operates on computing devices directly controlled by the user of the system 102. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 102 operate.

In certain embodiments, one or more of the components of the system 102 can be implemented in a shared computing resource environment. In this context, a shared computing resource environment or cloud-based service can refer to a service hosted by one more computing resources that are accessible to end users over a network, for example, by using a web browser or other application on a client device to interface with the remote computing resources. For example, a service provider may provide a system 102 by managing computing resources configured to implement various aspects of the system (e.g., intake system 110, indexing system 112, query system 114, shared storage system 116, other components, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

When implemented in a shared computing resource environment, the underlying hardware (non-limiting examples: processors, hard drives, solid-state memory, RAM, etc.) on which the components of the system 102 execute can be shared by multiple customers or tenants as part of the shared computing resource environment. In addition, when implemented in a shared computing resource environment as a cloud-based service, various components of the system 102 can be implemented using containerization or operating-system-level virtualization, or other virtualization technique. For example, one or more components of the intake system 110, indexing system 112, or query system 114 can be implemented as separate software containers or container instances. Each container instance can have certain computing resources (e.g., memory, processor, etc.) of an underlying hosting computing system (e.g., server, microprocessor, etc.) assigned to it, but may share the same operating system and may use the operating system's system call interface. Each container may provide an isolated execution environment on the host system, such as by providing a memory space of the hosting system that is logically isolated from memory space of other containers. Further, each container may run the same or different computer applications concurrently or separately, and may interact with each other. Although reference is made herein to containerization and container instances, it will be understood that other virtualization techniques can be used. For example, the components can be implemented using virtual machines using full virtualization or paravirtualization, etc. Thus, where reference is made to "containerized" components, it should be understood that such components may additionally or alternatively be implemented in other isolated execution environments, such as a virtual machine environment.

Implementing the system 102 in a shared computing resource environment can provide a number of benefits. In some cases, implementing the system 102 in a shared computing resource environment can make it easier to install, maintain, and update the components of the system 102. For example, rather than accessing designated hardware at a particular location to install or provide a component of the system 102, a component can be remotely instantiated or updated as desired. Similarly, implementing the system 102 in a shared computing resource environment or as a cloud-based service can make it easier to meet dynamic demand. For example, if the system 102 experiences significant load at indexing or search, additional compute resources can be deployed to process the additional data or queries. In an "on-premises" environment, this type of flexibility and scalability may not be possible or feasible.

In addition, by implementing the system 102 in a shared computing resource environment or as a cloud-based service can improve compute resource utilization. For example, in an on-premises environment if the designated compute resources are not being used by, they may sit idle and unused. In a shared computing resource environment, if the compute resources for a particular component are not being used, they can be re-allocated to other tasks within the system 102 and/or to other systems unrelated to the system 102.

As mentioned, in an on-premises environment, data from one instance of a system 102 is logically and physically separated from the data of another instance of a system 102 by virtue of each instance having its own designated hardware. As such, data from different customers of the system 102 is logically and physically separated from each other. In a shared computing resource environment, components of a system 102 can be configured to process the data from one customer or tenant or from multiple customers or tenants. Even in cases where a separate component of a system 102 is used for each customer, the underlying hardware on which the components of the system 102 are instantiated may still process data from different tenants. Accordingly, in a shared computing resource environment, the data from different tenants may not be physically separated on distinct hardware devices. For example, data from one tenant may reside on the same hard drive as data from another tenant or be processed by the same processor. In such cases, the system 102 can maintain logical separation between tenant data. For example, the system 102 can include separate directories for different tenants and apply different permissions and access controls to access the different directories or to process the data, etc.

In certain cases, the tenant data from different tenants is mutually exclusive and/or independent from each other. For example, in certain cases, Tenant A and Tenant B do not share the same data, similar to the way in which data from a local hard drive of Customer A is mutually exclusive and independent of the data (and not considered part) of a local hard drive of Customer B. While Tenant A and Tenant B may have matching or identical data, each tenant would have a separate copy of the data. For example, with reference again to the local hard drive of Customer A and Customer B example, each hard drive could include the same file. However, each instance of the file would be considered part of the separate hard drive and would be independent of the other file. Thus, one copy of the file would be part of Customer's A hard drive and a separate copy of the file would be part of Customer B's hard drive. In a similar manner, to the extent Tenant A has a file that is identical to a file of Tenant B, each tenant would have a distinct and independent copy of the file stored in different locations on a data store or on different data stores.

Further, in certain cases, the system 102 can maintain the mutual exclusivity and/or independence between tenant data even as the tenant data is being processed, stored, and searched by the same underlying hardware. In certain cases, to maintain the mutual exclusivity and/or independence between the data of different tenants, the system 102 can use tenant identifiers to uniquely identify data associated with different tenants.

In a shared computing resource environment, some components of the system 102 can be instantiated and designated for individual tenants and other components can be shared by multiple tenants. In certain embodiments, a separate intake system 110, indexing system 112, and query system 114 can be instantiated for each tenant, whereas the shared storage system 116 or other components (e.g., data store, metadata catalog, and/or acceleration data store, described below) can be shared by multiple tenants. In some such embodiments where components are shared by multiple tenants, the components can maintain separate directories for the different tenants to ensure their mutual exclusivity and/or independence from each other. Similarly, in some such embodiments, the system 102 can use different hosting computing systems or different isolated execution environments to process the data from the different tenants as part of the intake system 110, indexing system 112, and/or query system 114.

In some embodiments, individual components of the intake system 110, indexing system 112, and/or query system 114 may be instantiated for each tenant or shared by multiple tenants. For example, some individual intake system components (e.g., forwarders, output ingestion buffer) may be instantiated and designated for individual tenants, while other intake system components (e.g., a data retrieval subsystem, intake ingestion buffer, and/or streaming data processor), may be shared by multiple tenants.

In certain embodiments, an indexing system 112 (or certain components thereof) can be instantiated and designated for a particular tenant or shared by multiple tenants. In some embodiments where a separate indexing system 112 is instantiated and designated for each tenant, different resources can be reserved for different tenants. For example, Tenant A can be consistently allocated a minimum of four indexing nodes and Tenant B can be consistently allocated a minimum of two indexing nodes. In some such embodiments, the four indexing nodes can be reserved for Tenant A and the two indexing nodes can be reserved for Tenant B, even if Tenant A and Tenant B are not using the reserved indexing nodes.

In embodiments where an indexing system 112 is shared by multiple tenants, components of the indexing system 112 can be dynamically assigned to different tenants. For example, if Tenant A has greater indexing demands, additional indexing nodes can be instantiated or assigned to Tenant A's data. However, as the demand decreases, the indexing nodes can be reassigned to a different tenant, or terminated. Further, in some embodiments, a component of the indexing system 112 can concurrently process data from the different tenants.

In some embodiments, one instance of query system 114 may be shared by multiple tenants. In some such cases, the same search head can be used to process/execute queries for different tenants and/or the same search nodes can be used to execute query for different tenants. Further, in some such cases, different tenants can be allocated different amounts of compute resources. For example, Tenant A may be assigned more search heads or search nodes based on demand or based on a service level arrangement than another tenant. However, once a search is completed the search head and/or nodes assigned to Tenant A may be assigned to Tenant B, deactivated, or their resource may be re-allocated to other components of the system 102, etc.

In some cases, by sharing more components with different tenants, the functioning of the system 102 can be improved. For example, by sharing components across tenants, the system 102 can improve resource utilization thereby reducing the amount of resources allocated as a whole. For example, if four indexing nodes, two search heads, and four search nodes are reserved for each tenant then those compute resources are unavailable for use by other processes or tenants, even if they go unused. In contrast, by sharing the indexing nodes, search heads, and search nodes with different tenants and instantiating additional compute resources, the system 102 can use fewer resources overall while providing improved processing time for the tenants that are using the compute resources. For example, if tenant A is not using any search nodes 506 and tenant B has many searches running, the system 102 can use search nodes that would have been reserved for tenant A to service tenant B. In this way, the system 102 can decrease the number of compute resources used/reserved, while improving the search time for tenant B and improving compute resource utilization.

2.0. Data Ingestion, Indexing, and Storage

FIG. 2 is a flow diagram illustrating an embodiment of a routine implemented by the system 102 to process, index, and store data received from host devices 104. The data flow illustrated in FIG. 2 is provided for illustrative purposes only. It will be understood that one or more of the steps of the processes illustrated in FIG. 2 may be removed or that the ordering of the steps may be changed. Furthermore, for the purposes of illustrating a clear example, one or more particular system components are described in the context of performing various operations during each of the data flow stages. For example, the intake system 110 is described as receiving machine data and the indexing system 112 is described as generating events, grouping events, and storing events. However, other system arrangements and distributions of the processing steps across system components may be used. For example, in some cases, the intake system 110 may generate events.

At block 202, the intake system 110 receives data from a host device 104. The intake system 110 initially may receive the data as a raw data stream generated by the host device 104. For example, the intake system 110 may receive a data stream from a log file generated by an application server, from a stream of network data from a network device, or from any other source of data. Non-limiting examples of machine data that can be received by the intake system 110 is described herein with reference to FIG. 3A.

In some embodiments, the intake system 110 receives the raw data and may segment the data stream into messages, possibly of a uniform data size, to facilitate subsequent processing steps. The intake system 110 may thereafter process the messages in accordance with one or more rules to conduct preliminary processing of the data. In one embodiment, the processing conducted by the intake system 110 may be used to indicate one or more metadata fields applicable to each message. For example, the intake system 110 may include metadata fields within the messages, or publish the messages to topics indicative of a metadata field. These metadata fields may, for example, provide information related to a message as a whole and may apply to each event that is subsequently derived from the data in the message. For example, the metadata fields may include separate fields specifying each of a host, a source, and a sourcetype related to the message. A host field may contain a value identifying a host name or IP address of a device that generated the data. A source field may contain a value identifying a source of the data, such as a pathname of a file or a protocol and port related to received network data. A sourcetype field may contain a value specifying a particular sourcetype label for the data. Additional metadata fields may also be included, such as a character encoding of the data, if known, and possibly other values that provide information relevant to later processing steps. In certain embodiments, the intake system 110 may perform additional operations, such as, but not limited to, identifying individual events within the data, determining timestamps for the data, further enriching the data, etc.

At block 204, the indexing system 112 generates events from the data. In some cases, as part of generating the events, the indexing system 112 can parse the data of the message. In some embodiments, the indexing system 112 can determine a sourcetype associated with each message (e.g., by extracting a sourcetype label from the metadata fields associated with the message, etc.) and refer to a sourcetype configuration corresponding to the identified sourcetype to parse the data of the message. The sourcetype definition may include one or more properties that indicate to the indexing system 112 to automatically determine the boundaries within the received data that indicate the portions of machine data for events. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a sourcetype for the data is unknown to the indexing system 112, the indexing system 112 may infer a sourcetype for the data by examining the structure of the data. Then, the indexing system 112 can apply an inferred sourcetype definition to the data to create the events.

In addition, as part of generating events from the data, the indexing system 112 can determine a timestamp for each event. Similar to the process for parsing machine data, the indexing system 112 may again refer to a sourcetype definition associated with the data to locate one or more properties that indicate instructions for determining a timestamp for each event. The properties may, for example, instruct the indexing system 112 to extract a time value from a portion of data for the event (e.g., using a regex rule), to interpolate time values based on timestamps associated with temporally proximate events, to create a timestamp based on a time the portion of machine data was received or generated, to use the timestamp of a previous event, or use any other rules for determining timestamps, etc.

The indexing system 112 can also associate events with one or more metadata fields. In some embodiments, a timestamp may be included in the metadata fields. These metadata fields may include any number of "default fields" that are associated with all events, and may also include one more custom fields as defined by a user. In certain embodiments, the default metadata fields associated with each event may include a host, source, and sourcetype field including or in addition to a field storing the timestamp.

In certain embodiments, the indexing system 112 can also apply one or more transformations to event data that is to be included in an event. For example, such transformations can include removing a portion of the event data (e.g., a portion used to define event boundaries, extraneous characters from the event, other extraneous text, etc.), masking a portion of event data (e.g., masking a credit card number), removing redundant portions of event data, etc. The transformations applied to event data may, for example, be specified in one or more configuration files and referenced by one or more sourcetype definitions.

At block 206, the indexing system 112 can group events. In some embodiments, the indexing system 112 can group events based on time. For example, events generated within a particular time period or events that have a time stamp within a particular time period can be grouped together to form a bucket. A non-limiting example of a bucket is described herein with reference to FIG. 3B.

In certain embodiments, multiple components of the indexing system, such as an indexing node, can concurrently generate events and buckets. Furthermore, each indexing node that generates and groups events can concurrently generate multiple buckets. For example, multiple processors of an indexing node can concurrently process data, generate events, and generate buckets. Further, multiple indexing nodes can concurrently generate events and buckets. As such, ingested data can be processed in a highly distributed manner.

In some embodiments, as part of grouping events together, the indexing system 112 can generate one or more inverted indexes for a particular group of events. A non-limiting example of an inverted index is described herein with reference to FIG. 3C. In certain embodiments, the inverted indexes can include location information for events of a bucket. For example, the events of a bucket may be compressed into one or more files to reduce their size. The inverted index can include location information indicating the particular file and/or location within a particular file of a particular event.

In certain embodiments, the inverted indexes may include keyword entries or entries for field values or field name-value pairs found in events. In some cases, a field name-value pair can include a pair of words connected by a symbol, such as an equals sign or colon. The entries can also include location information for events that include the keyword, field value, or field value pair. In this way, relevant events can be quickly located. In some embodiments, fields can automatically be generated for some or all of the field names of the field name-value pairs at the time of indexing. For example, if the string "dest=10.0.1.2" is found in an event, a field named "dest" may be created for the event, and assigned a value of "10.0.1.2." In certain embodiments, the indexing system can populate entries in the inverted index with field name-value pairs by parsing events using one or more regex rules to determine a field value associated with a field defined by the regex rule. For example, the regex rule may indicate how to find a field value for a userID field in certain events. In some cases, the indexing system 112 can use the sourcetype of the event to determine which regex to use for identifying field values.

Figure 3C:
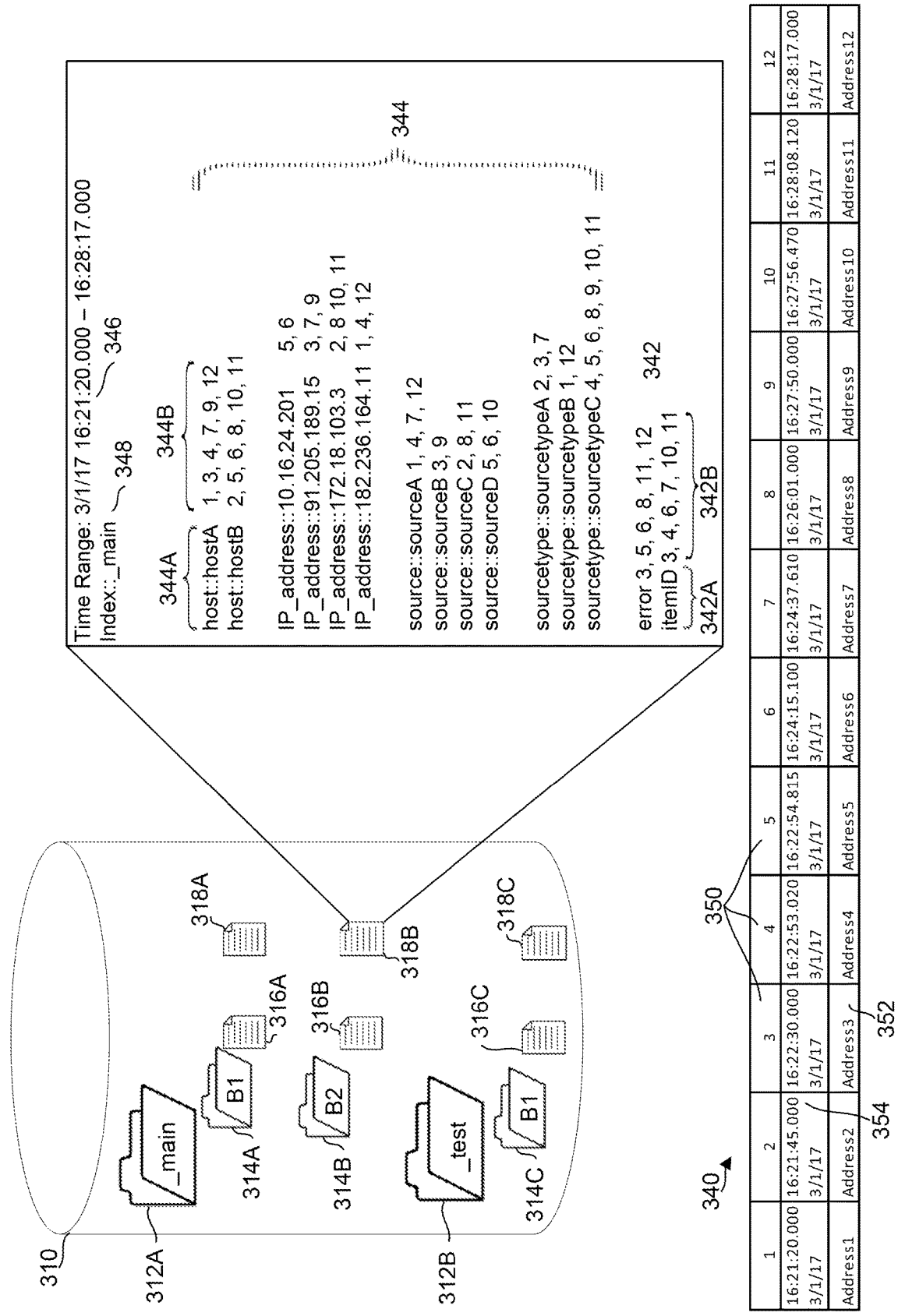

At block 208, the indexing system 112 stores the events with an associated timestamp in the storage system 116, which may be in a local data store and/or in a shared storage system. Timestamps enable a user to search for events based on a time range. In some embodiments, the stored events are organized into "buckets," where each bucket stores events associated with a specific time range based on the timestamps associated with each event. As mentioned, FIGS. 3B and 3C illustrate an example of a bucket. This improves time-based searching, as well as allows for events with recent timestamps, which may have a higher likelihood of being accessed, to be stored in a faster memory to facilitate faster retrieval. For example, buckets containing the most recent events can be stored in flash memory rather than on a hard disk. In some embodiments, each bucket may be associated with an identifier, a time range, and a size constraint.

The indexing system 112 may be responsible for storing the events in the storage system 116. As mentioned, the events or buckets can be stored locally on a component of the indexing system 112 or in a shared storage system 116. In certain embodiments, the component that generates the events and/or stores the events (indexing node) can also be assigned to search the events. In some embodiments separate components can be used for generating and storing events (indexing node) and for searching the events (search node).

By storing events in a distributed manner (either by storing the events at different components or in a shared storage system 116), the query system 114 can analyze events for a query in parallel. For example, using map-reduce techniques, multiple components of the query system (e.g., indexing or search nodes) can concurrently search and provide partial responses for a subset of events to another component (e.g., search head) that combines the results to produce an answer for the query. By storing events in buckets for specific time ranges, the indexing system 112 may further optimize the data retrieval process by the query system 114 to search buckets corresponding to time ranges that are relevant to a query. In some embodiments, each bucket may be associated with an identifier, a time range, and a size constraint. In certain embodiments, a bucket can correspond to a file system directory and the machine data, or events, of a bucket can be stored in one or more files of the file system directory. The file system directory can include additional files, such as one or more inverted indexes, high performance indexes, permissions files, configuration files, etc.

In embodiments where components of the indexing system 112 store buckets locally, the components can include a home directory and a cold directory. The home directory can store hot buckets and warm buckets, and the cold directory stores cold buckets. A hot bucket can refer to a bucket that is capable of receiving and storing additional events. A warm bucket can refer to a bucket that can no longer receive events for storage, but has not yet been moved to the cold directory. A cold bucket can refer to a bucket that can no longer receive events and may be a bucket that was previously stored in the home directory. The home directory may be stored in faster memory, such as flash memory, as events may be actively written to the home directory, and the home directory may typically store events that are more frequently searched and thus are accessed more frequently. The cold directory may be stored in slower and/or larger memory, such as a hard disk, as events are no longer being written to the cold directory, and the cold directory may typically store events that are not as frequently searched and thus are accessed less frequently. In some embodiments, components of the indexing system 112 may also have a quarantine bucket that contains events having potentially inaccurate information, such as an incorrect timestamp associated with the event or a timestamp that appears to be an unreasonable timestamp for the corresponding event. The quarantine bucket may have events from any time range; as such, the quarantine bucket may always be searched at search time. Additionally, components of the indexing system may store old, archived data in a frozen bucket that is not capable of being searched at search time. In some embodiments, a frozen bucket may be stored in slower and/or larger memory, such as a hard disk, and may be stored in offline and/or remote storage.

In some embodiments, components of the indexing system 112 may not include a cold directory and/or cold or frozen buckets. For example, in embodiments where buckets are copied to a shared storage system 116 and searched by separate components of the query system 114, buckets can be deleted from components of the indexing system as they are stored to the storage system 116. In certain embodiments, the shared storage system 116 may include a home directory that includes warm buckets copied from the indexing system 112 and a cold directory of cold or frozen buckets as described above.

FIG. 3A is a block diagram illustrating an embodiment of machine data received by the system 102. The machine data can correspond to data from one or more host devices 104 or data sources. As mentioned, the data source can correspond to a log file, data stream or other data structure that is accessible by a host device 104. In the illustrated embodiment of FIG. 3A, the machine data has different forms. For example, the machine data 302 may be log data that is unstructured or that does not have any clear structure or fields, and include different portions 302A-302E that correspond to different entries of the log and that separated by boundaries. Such data may also be referred to as raw machine data.

The machine data 304 may be referred to as structured or semi-structured machine data as it does include some data in a JSON structure defining certain field and field values (e.g., machine data 304A showing field name:field values container name:kube-apiserver, host:ip 172 20 43 173.ec2.internal, pod_id:0a73017b-4efa-11e8-a4e1-0a2bf2ab4bba, etc.), but other parts of the machine data 304 is unstructured or raw machine data (e.g., machine data 304B). The machine data 306 may be referred to as structured data as it includes particular rows and columns of data with field names and field values.

In some embodiments, the machine data 302 can correspond to log data generated by a host device 104 configured as an Apache server, the machine data 304 can correspond to log data generated by a host device 104 in a shared computing resource environment, and the machine data 306 can correspond to metrics data. Given the differences between host devices 104 that generated the log data 302, 304, the form of the log data 302, 304 is different. In addition, as the log data 304 is from a host device 104 in a shared computing resource environment, it can include log data generated by an application being executed within an isolated execution environment (304B, excluding the field name "log:") and log data generated by an application that enables the sharing of computing resources between isolated execution environments (all other data in 304). Although shown together in FIG. 3A, it will be understood that machine data with different hosts, sources, or sourcetypes can be received separately and/or found in different data sources and/or host devices 104.

As described herein, the system 102 can process the machine data based on the form in which it is received. In some cases, the intake system 110 can utilize one or more rules to process the data. In certain embodiments, the intake system 110 can enrich the received data. For example, the intake system may add one or more fields to the data received from the host devices 104, such as fields denoting the host, source, sourcetype, index, or tenant associated with the incoming data. In certain embodiments, the intake system 110 can perform additional processing on the incoming data, such as transforming structured data into unstructured data (or vice versa), identifying timestamps associated with the data, removing extraneous data, parsing data, indexing data, separating data, categorizing data, routing data based on criteria relating to the data being routed, and/or performing other data transformations, etc.

In some cases, the data processed by the intake system 110 can be communicated or made available to the indexing system 112, the query system 114, and/or to other systems. In some embodiments, the intake system 110 communicates or makes available streams of data using one or more shards. For example, the indexing system 112 may read or receive data from one shard and another system may receive data from another shard. As another example, multiple systems may receive data from the same shard.

As used herein, a partition can refer to a logical division of data. In some cases, the logical division of data may refer to a portion of a data stream, such as a shard from the intake system 110. In certain cases, the logical division of data can refer to an index or other portion of data stored in the storage system 116, such as different directories or file structures used to store data or buckets. Accordingly, it will be understood that the logical division of data referenced by the term partition will be understood based on the context of its use.

FIGS. 3B and 3C are block diagrams illustrating embodiments of various data structures for storing data processed by the system 102. FIG. 3B includes an expanded view illustrating an example of machine data stored in a data store 310 of the data storage system 116. It will be understood that the depiction of machine data and associated metadata as rows and columns in the table 319 of FIG. 3B is merely illustrative and is not intended to limit the data format in which the machine data and metadata is stored in various embodiments described herein. In one particular embodiment, machine data can be stored in a compressed or encrypted format. In such embodiments, the machine data can be stored with or be associated with data that describes the compression or encryption scheme with which the machine data is stored. The information about the compression or encryption scheme can be used to decompress or decrypt the machine data, and any metadata with which it is stored, at search time.

In the illustrated embodiment of FIG. 3B the data store 310 includes a directory 312 (individually referred to as 312A, 312B) for each index (or partition) that contains a portion of data stored in the data store 310 and a sub-directory 314 (individually referred to as 314A, 314B, 314C) for one or more buckets of the index. In the illustrated embodiment of FIG. 3B, each sub-directory 314 corresponds to a bucket and includes an event data file 316 (individually referred to as 316A, 316B, 316C) and an inverted index 318 (individually referred to as 318A, 318B, 318C). However, it will be understood that each bucket can be associated with fewer or more files and each sub-directory 314 can store fewer or more files.

In the illustrated embodiment, the data store 310 includes a_main directory 312A associated with an index "_main" and a test directory 312B associated with an index "_test." However, the data store 310 can include fewer or more directories. In some embodiments, multiple indexes can share a single directory or all indexes can share a common directory. Additionally, although illustrated as a single data store 310, it will be understood that the data store 310 can be implemented as multiple data stores storing different portions of the information shown in FIG. 3C. For example, a single index can span multiple directories or multiple data stores.

Furthermore, although not illustrated in FIG. 3B, it will be understood that, in some embodiments, the data store 310 can include directories for each tenant and sub-directories for each index of each tenant, or vice versa. Accordingly, the directories 312A and 312B can, in certain embodiments, correspond to sub-directories of a tenant or include sub-directories for different tenants.

In the illustrated embodiment of FIG. 3B, two sub-directories 314A, 314B of the _main directory 312A and one sub-directory 312C of the test directory 312B are shown. The sub-directories 314A, 314B, 314C can correspond to buckets of the indexes associated with the directories 312A, 312B. For example, the sub-directories 314A and 314B can correspond to buckets "B1" and "B2," respectively, of the index "_main" and the sub-directory 314C can correspond to bucket "B1" of the index "test." Accordingly, even though there are two "B1" buckets shown, as each "B1" bucket is associated with a different index (and corresponding directory 312), the system 102 can uniquely identify them.

Although illustrated as buckets "B1" and "B2," it will be understood that the buckets (and/or corresponding sub-directories 314) can be named in a variety of ways. In certain embodiments, the bucket (or sub-directory) names can include information about the bucket. For example, the bucket name can include the name of the index with which the bucket is associated, a time range of the bucket, etc.

As described herein, each bucket can have one or more files associated with it, including, but not limited to one or more raw machine data files, bucket summary files, filter files, inverted indexes (also referred to herein as high performance indexes or keyword indexes), permissions files, configuration files, etc. In the illustrated embodiment of FIG. 3B, the files associated with a particular bucket can be stored in the sub-directory corresponding to the particular bucket. Accordingly, the files stored in the sub-directory 314A can correspond to or be associated with bucket "B1," of index "_main," the files stored in the sub-directory 314B can correspond to or be associated with bucket "B2" of index "_main," and the files stored in the sub-directory 314C can correspond to or be associated with bucket "B1" of index "_test."

FIG. 3B further illustrates an expanded event data file 316C showing an example of data that can be stored therein. In the illustrated embodiment, four events 320, 322, 324, 326 of the machine data file 316C are shown in four rows. Each event 320-326 includes machine data 330 and a timestamp 332. The machine data 330 can correspond to the machine data received by the system 102. For example, in the illustrated embodiment, the machine data 330 of events 320, 322, 324, 326 corresponds to portions 302A, 302B, 302C, 302D, respectively, of the machine data 302 after it was processed by the indexing system 112.

Metadata 334-338 associated with the events 320-326 is also shown in the table 319. In the illustrated embodiment, the metadata 334-338 includes information about a host 334, source 336, and sourcetype 338 associated with the events 320-326. Any of the metadata can be extracted from the corresponding machine data, or supplied or defined by an entity, such as a user or computer system. The metadata fields 334-338 can become part of, stored with, or otherwise associated with the events 320-326. In certain embodiments, the metadata 334-338 can be stored in a separate file of the sub-directory 314C and associated with the machine data file 316C. In some cases, while the timestamp 332 can be extracted from the raw data of each event, the values for the other metadata fields may be determined by the indexing system 112 based on information it receives pertaining to the host device 104 or data source of the data separate from the machine data.

While certain default or user-defined metadata fields can be extracted from the machine data for indexing purposes, the machine data within an event can be maintained in its original condition. As such, in embodiments in which the portion of machine data included in an event is unprocessed or otherwise unaltered, it is referred to herein as a portion of raw machine data. For example, in the illustrated embodiment, the machine data of events 320-326 is identical to the portions of the machine data 302A-302D, respectively, used to generate a particular event. Similarly, the entirety of the machine data 302 may be found across multiple events. As such, unless certain information needs to be removed for some reasons (e.g. extraneous information, confidential information), all the raw machine data contained in an event can be preserved and saved in its original form. Accordingly, the data store in which the event records are stored is sometimes referred to as a "raw record data store." The raw record data store contains a record of the raw event data tagged with the various fields.

In other embodiments, the portion of machine data in an event can be processed or otherwise altered relative to the machine data used to create the event. With reference to the machine data 304, the machine data of a corresponding event (or events) may be modified such that only a portion of the machine data 304 is stored as one or more events. For example, in some cases, only machine data 304B of the machine data 304 may be retained as one or more events or the machine data 304 may be altered to remove duplicate data, confidential information, etc.

In FIG. 3B, the first three rows of the table 319 present events 320, 322, and 324 and are related to a server access log that records requests from multiple clients processed by a server, as indicated by entry of "access.log" in the source column 336. In the example shown in FIG. 3B, each of the events 320-324 is associated with a discrete request made to the server by a client. The raw machine data generated by the server and extracted from a server access log can include the IP address 1140 of the client, the user id 1141 of the person requesting the document, the time 1142 the server finished processing the request, the request line 1143 from the client, the status code 1144 returned by the server to the client, the size of the object 1145 returned to the client (in this case, the gif file requested by the client) and the time spent 1146 to serve the request in microseconds. In the illustrated embodiments of FIGS. 3A, 3B, all the raw machine data retrieved from the server access log is retained and stored as part of the corresponding events 320-324 in the file 316C.

Event 326 is associated with an entry in a server error log, as indicated by "error.log" in the source column 336 that records errors that the server encountered when processing a client request. Similar to the events related to the server access log, all the raw machine data in the error log file pertaining to event 326 can be preserved and stored as part of the event 326.

Saving minimally processed or unprocessed machine data in a data store associated with metadata fields in the manner similar to that shown in FIG. 3B is advantageous because it allows search of all the machine data at search time instead of searching only previously specified and identified fields or field-value pairs. As mentioned above, because data structures used by various embodiments of the present disclosure maintain the underlying raw machine data and use a late-binding schema for searching the raw machines data, it enables a user to continue investigating and learn valuable insights about the raw data. In other words, the user is not compelled to know about all the fields of information that will be needed at data ingestion time. As a user learns more about the data in the events, the user can continue to refine the late-binding schema by defining new extraction rules, or modifying or deleting existing extraction rules used by the system.

FIG. 3C illustrates an embodiment of another file that can be included in one or more subdirectories 314 or buckets. Specifically, FIG. 3C illustrates an exploded view of an embodiments of an inverted index 318B in the sub-directory 314B, associated with bucket "B2" of the index "_main," as well as an event reference array 340 associated with the inverted index 318B.

In some embodiments, the inverted indexes 318 can correspond to distinct time-series buckets. As such, each inverted index 318 can correspond to a particular range of time for an index. In the illustrated embodiment of FIG. 3C, the inverted indexes 318A, 318B correspond to the buckets "B1" and "B2," respectively, of the index "_main," and the inverted index 318C corresponds to the bucket "B1" of the index "_test." In some embodiments, an inverted index 318 can correspond to multiple time-series buckets (e.g., include information related to multiple buckets) or inverted indexes 318 can correspond to a single time-series bucket.

Each inverted index 318 can include one or more entries, such as keyword (or token) entries 342 or field-value pair entries 344. Furthermore, in certain embodiments, the inverted indexes 318 can include additional information, such as a time range 346 associated with the inverted index or an index identifier 348 identifying the index associated with the inverted index 318. It will be understood that each inverted index 318 can include less or more information than depicted. For example, in some cases, the inverted indexes 318 may omit a time range 346 and/or index identifier 348. In some such embodiments, the index associated with the inverted index 318 can be determined based on the location (e.g., directory 312) of the inverted index 318 and/or the time range of the inverted index 318 can be determined based on the name of the sub-directory 314.

Token entries, such as token entries 342 illustrated in inverted index 318B, can include a token 342A (e.g., "error," "itemID," etc.) and event references 342B indicative of events that include the token. For example, for the token "error," the corresponding token entry includes the token "error" and an event reference, or unique identifier, for each event stored in the corresponding time-series bucket that includes the token "error." In the illustrated embodiment of FIG. 3C, the error token entry includes the identifiers 3, 5, 6, 8, 11, and 12 corresponding to events located in the bucket "B2" of the index "_main."

In some cases, some token entries can be default entries, automatically determined entries, or user specified entries. In some embodiments, the indexing system 112 can identify each word or string in an event as a distinct token and generate a token entry for the identified word or string. In some cases, the indexing system 112 can identify the beginning and ending of tokens based on punctuation, spaces, etc. In certain cases, the indexing system 112 can rely on user input or a configuration file to identify tokens for token entries 342, etc. It will be understood that any combination of token entries can be included as a default, automatically determined, or included based on user-specified criteria.

Similarly, field-value pair entries, such as field-value pair entries 344 shown in inverted index 318B, can include a field-value pair 344A and event references 344B indicative of events that include a field value that corresponds to the field-value pair (or the field-value pair). For example, for a field-value pair sourcetype::sendmail, a field-value pair entry 344 can include the field-value pair "sourcetype::

sendmail" and a unique identifier, or event reference, for each event stored in the corresponding time-series bucket that includes a sourcetype "sendmail."

In some cases, the field-value pair entries 344 can be default entries, automatically determined entries, or user specified entries. As a non-limiting example, the field-value pair entries for the fields "host," "source," and "sourcetype" can be included in the inverted indexes 318 as a default. As such, all of the inverted indexes 318 can include field-value pair entries for the fields "host," "source," and "sourcetype." As yet another non-limiting example, the field-value pair entries for the field "IP address" can be user specified and may only appear in the inverted index 318B or the inverted indexes 318A, 318B of the index "main" based on user-specified criteria. As another non-limiting example, as the indexing system 112 indexes the events, it can automatically identify field-value pairs and create field-value pair entries 344. For example, based on the indexing system's 212 review of events, it can identify IP address as a field in each event and add the IP address field-value pair entries to the inverted index 318B (e.g., based on punctuation, like two keywords separated by an '=' or ':' etc.). It will be understood that any combination of field-value pair entries can be included as a default, automatically determined, or included based on user-specified criteria.

With reference to the event reference array 340, each unique identifier 350, or event reference, can correspond to a unique event located in the time series bucket or machine data file 316B. The same event reference can be located in multiple entries of an inverted index 318. For example if an event has a sourcetype "splunkd," host "www1" and token "warning," then the unique identifier for the event can appear in the field-value pair entries 344 "sourcetype::splunkd" and "host::www1," as well as the token entry "warning." With reference to the illustrated embodiment of FIG. 3C and the event that corresponds to the event reference 3, the event reference 3 is found in the field-value pair entries 344 "host::hostA," "source::sourceB," "sourcetype::sourcetypeA," and "IP address::91.205.189.15" indicating that the event corresponding to the event references is from hostA, sourceB, of sourcetypeA, and includes "91.205.189.15" in the event data.

For some fields, the unique identifier is located in only one field-value pair entry for a particular field. For example, the inverted index 318 may include four sourcetype field-value pair entries 344 corresponding to four different sourcetypes of the events stored in a bucket (e.g., sourcetypes: sendmail, splunkd, web_access, and web_service). Within those four sourcetype field-value pair entries, an identifier for a particular event may appear in only one of the field-value pair entries. With continued reference to the example illustrated embodiment of FIG. 3C, since the event reference 7 appears in the field-value pair entry "sourcetype::sourcetypeA," then it does not appear in the other field-value pair entries for the sourcetype field, including "sourcetype::sourcetypeB," "sourcetype::sourcetypeC," and "sourcetype::sourcetypeD."

The event references 350 can be used to locate the events in the corresponding bucket or machine data file 316. For example, the inverted index 318B can include, or be associated with, an event reference array 340. The event reference array 340 can include an array entry 350 for each event reference in the inverted index 318B. Each array entry 350 can include location information 352 of the event corresponding to the unique identifier (non-limiting example: seek address of the event, physical address, slice ID, etc.), a timestamp 354 associated with the event, or additional information regarding the event associated with the event reference, etc.

For each token entry 342 or field-value pair entry 344, the event reference 342B, 344B, respectively, or unique identifiers can be listed in chronological order or the value of the event reference can be assigned based on chronological data, such as a timestamp associated with the event referenced by the event reference. For example, the event reference 1 in the illustrated embodiment of FIG. 3C can correspond to the first-in-time event for the bucket, and the event reference 12 can correspond to the last-in-time event for the bucket. However, the event references can be listed in any order, such as reverse chronological order, ascending order, descending order, or some other order (e.g., based on time received or added to the machine data file), etc. Further, the entries can be sorted. For example, the entries can be sorted alphabetically (collectively or within a particular group), by entry origin (e.g., default, automatically generated, user-specified, etc.), by entry type (e.g., field-value pair entry, token entry, etc.), or chronologically by when added to the inverted index, etc. In the illustrated embodiment of FIG. 3C, the entries are sorted first by entry type and then alphabetically.

In some cases, inverted indexes 318 can decrease the search time of a query. For example, for a statistical query, by using the inverted index, the system 102 can avoid the computational overhead of parsing individual events in a machine data file 316. Instead, the system 102 can use the inverted index 318 separate from the raw record data store to generate responses to the received queries.

3.0. Query Processing and Execution

Figure 4A:
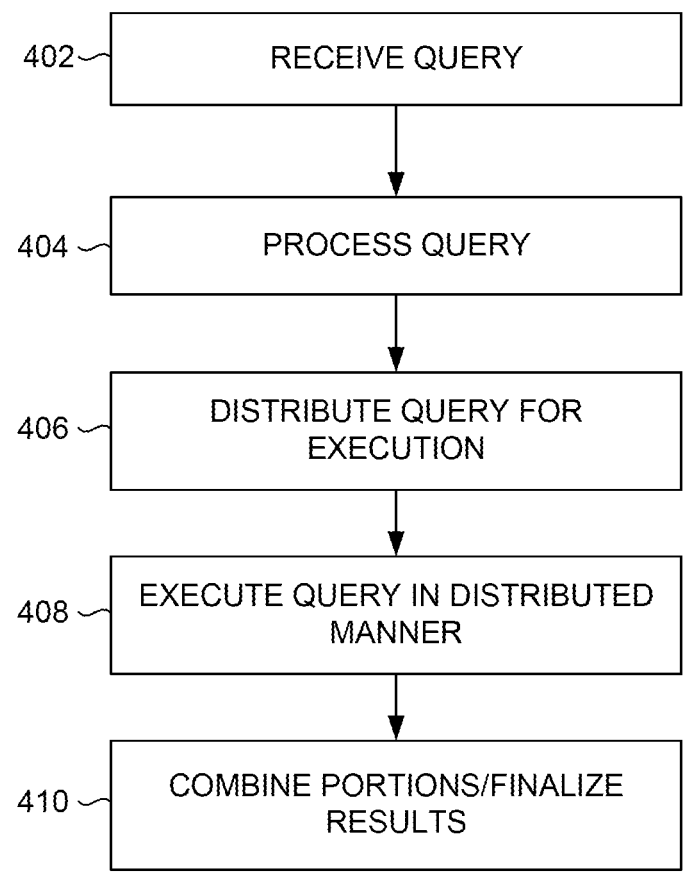
FIG. 4A is a flow diagram illustrating an embodiment of a routine implemented by the query system to execute a query.

FIG. 4A is a flow diagram illustrating an embodiment of a routine implemented by the query system 114 for executing a query. At block 402, the query system 114 receives a search query. As described herein, the query can be in the form of a pipelined command language or other query language and include filter criteria used to identify a set of data and processing criteria used to process the set of data.

At block 404, the query system 114 processes the query. As part of processing the query, the query system 114 can determine whether the query was submitted by an authenticated user and/or review the query to determine that it is in a proper format for the data intake and query system 102, has correct semantics and syntax, etc. In addition, the query system 114 can determine what, if any, configuration files or other configurations to use as part of the query.

In addition as part of processing the query, the query system 114 can determine what portion(s) of the query to execute in a distributed manner (e.g., what to delegate to search nodes) and what portions of the query to execute in a non-distributed manner (e.g., what to execute on the search head). For the parts of the query that are to be executed in a distributed manner, the query system 114 can generate specific commands, for the components that are to execute the query. This may include generating subqueries, partial queries or different phases of the query for execution by different components of the query system 114. In some cases, the query system 114 can use map-reduce techniques to determine how to map the data for the search and then reduce the data. Based on the map-reduce phases, the query system 114 can generate query commands for different components of the query system 114.

As part of processing the query, the query system 114 can determine where to obtain the data. For example, in some cases, the data may reside on one or more indexing nodes or search nodes, as part of the storage system 116 or may reside in a shared storage system or a system external to the system 102. In some cases, the query system 114 can determine what components to use to obtain and process the data. For example, the query system 114 can identify search nodes that are available for the query, etc.

At block 406, the query system 1206 distributes the determined portions or phases of the query to the appropriate components (e.g., search nodes). In some cases, the query system 1206 can use a catalog to determine which components to use to execute the query (e.g., which components include relevant data and/or are available, etc.).

At block 408, the components assigned to execute the query, execute the query. As mentioned, different components may execute different portions of the query. In some cases, multiple components (e.g., multiple search nodes) may execute respective portions of the query concurrently and communicate results of their portion of the query to another component (e.g., search head). As part of the identifying the set of data or applying the filter criteria, the components of the query system 114 can search for events that match the criteria specified in the query. These criteria can include matching keywords or specific values for certain fields. The searching operations at block 408 may use the late-binding schema to extract values for specified fields from events at the time the query is processed. In some embodiments, one or more rules for extracting field values may be specified as part of a sourcetype definition in a configuration file or in the query itself. In certain embodiments where search nodes are used to obtain the set of data, the search nodes can send the relevant events back to the search head, or use the events to determine a partial result, and send the partial result back to the search head.

At block 410, the query system 114 combines the partial results and/or events to produce a final result for the query. As mentioned, in some cases, combining the partial results and/or finalizing the results can include further processing the data according to the query. Such processing may entail joining different set of data, transforming the data, and/or performing one or more mathematical operations on the data, preparing the results for display, etc.

In some examples, the results of the query are indicative of performance or security of the IT environment and may help improve the performance of components in the IT environment. This final result may comprise different types of data depending on what the query requested. For example, the results can include a listing of matching events returned by the query, or some type of visualization of the data from the returned events. In another example, the final result can include one or more calculated values derived from the matching events.

The results generated by the query system 114 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring to the search jobs.

The query system 114 can also perform various operations to make the search more efficient. For example, before the query system 114 begins execution of a query, it can determine a time range for the query and a set of common keywords that all matching events include. The query system 114 may then use these parameters to obtain a superset of the eventual results. Then, during a filtering stage, the query system 114 can perform field-extraction operations on the superset to produce a reduced set of search results. This speeds up queries, which may be particularly helpful for queries that are performed on a periodic basis. In some cases, to make the search more efficient, the query system 114 can use information known about certain data sets that are part of the query to filter other data sets. For example, if an early part of the query includes instructions to obtain data with a particular field, but later commands of the query do not rely on the data with that particular field, the query system 114 can omit the superfluous part of the query from execution.

Various embodiments of the present disclosure can be implemented using, or in conjunction with, a pipelined command language. A pipelined command language is a language in which a set of inputs or data is operated on by a first command in a sequence of commands, and then subsequent commands in the order they are arranged in the sequence. Such commands can include any type of functionality for operating on data, such as retrieving, searching, filtering, aggregating, processing, transmitting, and the like. As described herein, a query can thus be formulated in a pipelined command language and include any number of ordered or unordered commands for operating on data.

Splunk Processing Language (SPL) is an example of a pipelined command language in which a set of inputs or data is operated on by any number of commands in a particular sequence. A sequence of commands, or command sequence, can be formulated such that the order in which the commands are arranged defines the order in which the commands are applied to a set of data or the results of an earlier executed command. For example, a first command in a command sequence can include filter criteria used to search or filter for specific data. The results of the first command can then be passed to another command listed later in the command sequence for further processing.

In various embodiments, a query can be formulated as a command sequence defined in a command line of a search UI. In some embodiments, a query can be formulated as a sequence of SPL commands. Some or all of the SPL commands in the sequence of SPL commands can be separated from one another by a pipe symbol "|." In some embodiments, a set of data, such as a set of events, can be operated on by a first SPL command in the sequence, and then a subsequent SPL command following a pipe symbol "|" after the first SPL command operates on the results produced by the first SPL command or other set of data, and so on for any additional SPL commands in the sequence. As such, a query formulated using SPL comprises a series of consecutive commands that are delimited by pipe "|" characters. The pipe character indicates to the system that the output or result of one command (to the left of the pipe) should be used as the input for one of the subsequent commands (to the right of the pipe). This enables formulation of queries defined by a pipeline of sequenced commands that refines or enhances the data at each step along the pipeline until the desired results are attained. Accordingly, various embodiments described herein can be implemented with Splunk Processing Language (SPL) used in conjunction with the SPLUNK® ENTERPRISE system.

While a query can be formulated in many ways, a query can start with a search command and one or more corresponding search terms or filter criteria at the beginning of the pipeline. Such search terms or filter criteria can include any combination of keywords, phrases, times, dates, Boolean expressions, fieldname-field value pairs, etc. that specify which results should be obtained from different locations. The results can then be passed as inputs into subsequent commands in a sequence of commands by using, for example, a pipe character. The subsequent commands in a sequence can include directives for additional processing of the results once it has been obtained from one or more indexes. For example, commands may be used to filter unwanted information out of the results, extract more information, evaluate field values, calculate statistics, reorder the results, create an alert, create summary of the results, or perform some type of aggregation function. In some embodiments, the summary can include a graph, chart, metric, or other visualization of the data. An aggregation function can include analysis or calculations to return an aggregate value, such as an average value, a sum, a maximum value, a root mean square, statistical values, and the like.

Due to its flexible nature, use of a pipelined command language in various embodiments is advantageous because it can perform "filtering" as well as "processing" functions. In other words, a single query can include a search command and search term expressions, as well as data-analysis expressions. For example, a command at the beginning of a query can perform a "filtering" step by retrieving a set of data based on a condition (e.g., records associated with server response times of less than 1 microsecond). The results of the filtering step can then be passed to a subsequent command in the pipeline that performs a "processing" step (e.g. calculation of an aggregate value related to the filtered events such as the average response time of servers with response times of less than 1 microsecond). Furthermore, the search command can allow events to be filtered by keyword as well as field criteria. For example, a search command can filter events based on the word "warning" or filter events based on a field value "10.0.1.2" associated with a field "clientip."

The results obtained or generated in response to a command in a query can be considered a set of results data. The set of results data can be passed from one command to another in any data format. In one embodiment, the set of result data can be in the form of a dynamically created table. Each command in a particular query can redefine the shape of the table. In some implementations, an event retrieved from an index in response to a query can be considered a row with a column for each field value. Columns can contain basic information about the data and/or data that has been dynamically extracted at search time.

Figure 4B:
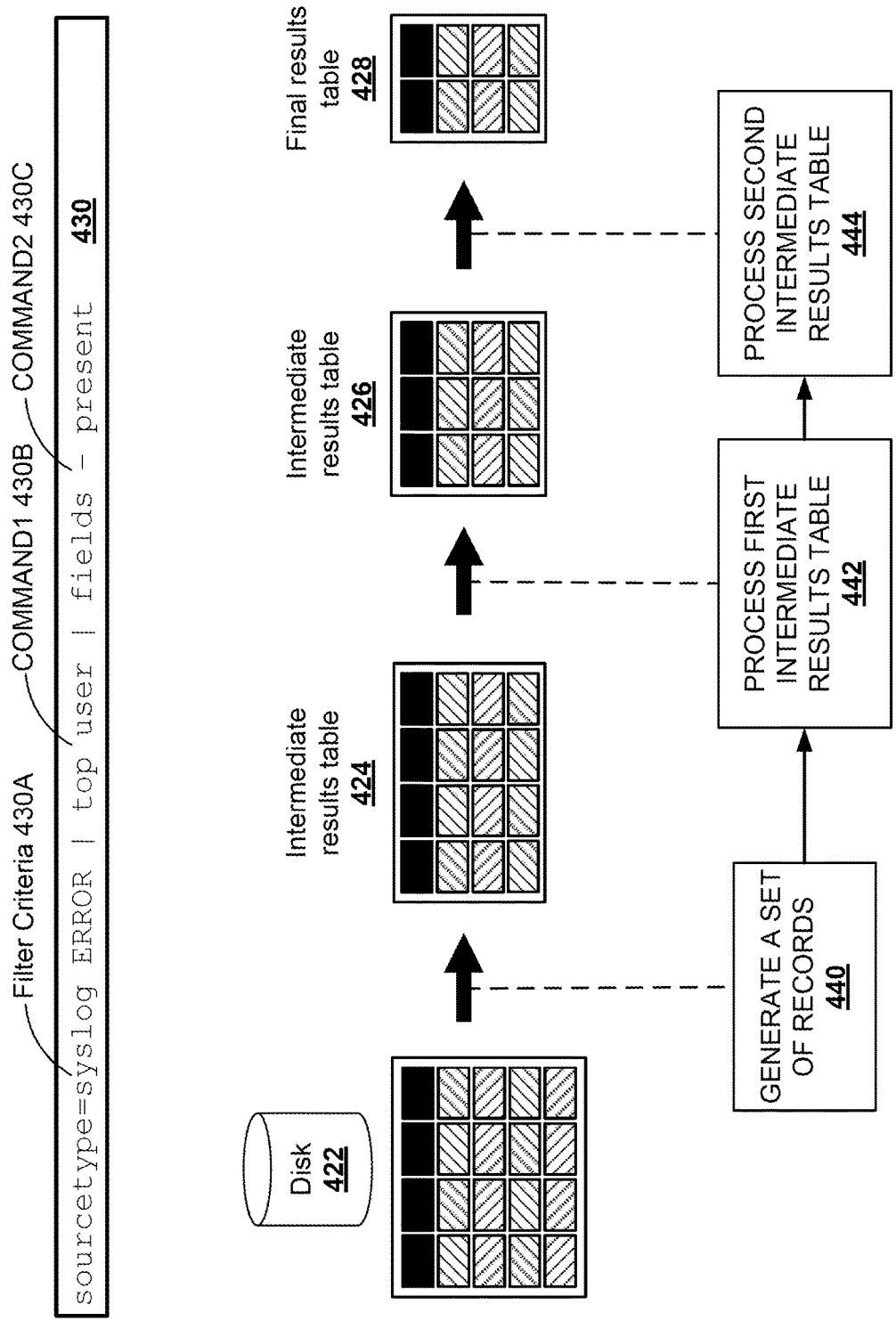
FIG. 4B provides a visual representation of the manner in which a pipelined command language or query can operate

FIG. 4B provides a visual representation of the manner in which a pipelined command language or query can operate in accordance with the disclosed embodiments. The query 430 can be input by the user and submitted to the query system 114. In the illustrated embodiment, the query 430 comprises filter criteria 430A, followed by two commands 430B, 430C (namely, Command1 and Command2). Disk 422 represents data as it is stored in a data store to be searched. For example, disk 422 can represent a portion of the storage system 116 or some other data store that can be searched by the query system 114. Individual rows of can represent different events and columns can represent different fields for the different events. In some cases, these fields can include raw machine data, host, source, and sourcetype.

At block 440, the query system 114 uses the filter criteria 430A (e.g., "sourcetype=syslog ERROR") to filter events stored on the disk 422 to generate an intermediate results table 424. Given the semantics of the query 430 and order of the commands, the query system 114 can execute the filter criteria 430A portion of the query 430 before executing Command1 or Command2.

Rows in the table 424 may represent individual records, where each record corresponds to an event in the disk 422 that satisfied the filter criteria. Columns in the table 424 may correspond to different fields of an event or record, such as "user," "count," percentage," "timestamp," or the raw machine data of an event, etc. Notably, the fields in the intermediate results table 424 may differ from the fields of the events on the disk 422. In some cases, this may be due to the late binding schema described herein that can be used to extract field values at search time. Thus, some of the fields in table 424 may not have existed in the events on disk 422.

Illustratively, the intermediate results table 424 has fewer rows than what is shown in the disk 422 because only a subset of events retrieved from the disk 422 matched the filter criteria 430A "sourcetype=syslog ERROR." In some embodiments, instead of searching individual events or raw machine data, the set of events in the intermediate results table 424 may be generated by a call to a pre-existing inverted index.

At block 442, the query system 114 processes the events of the first intermediate results table 424 to generate the second intermediate results table 426. With reference to the query 430, the query system 114 processes the events of the first intermediate results table 424 to identify the top users according to Command1. This processing may include determining a field value for the field "user" for each record in the intermediate results table 424, counting the number of unique instances of each "user" field value (e.g., number of users with the name David, John, Julie, etc.) within the intermediate results table 424, ordering the results from largest to smallest based on the count, and then keeping only the top 10 results (e.g., keep an identification of the top 10 most common users). Accordingly, each row of table 426 can represent a record that includes a unique field value for the field "user," and each column can represent a field for that record, such as fields "user," "count," and "percentage."

At block 444, the query system 114 processes the second intermediate results table 426 to generate the final results table 428. With reference to query 430, the query system 114 applies the command "fields—present" to the second intermediate results table 426 to generate the final results table 428. As shown, the command "fields—present" of the query 430 results in one less column, which may represent that a field was removed during processing. For example, the query system 114 may have determined that the field "percentage" was unnecessary for displaying the results based on the Command2. In such a scenario, each record of the final results table 428 would include a field "user," and "count." Further, the records in the table 428 would be ordered from largest count to smallest count based on the query commands.

It will be understood that the final results table 428 can be a third intermediate results table, which can be pipelined to another stage where further filtering or processing of the data can be performed, e.g., preparing the data for display purposes, filtering the data based on a condition, performing a mathematical calculation with the data, etc. In different embodiments, other query languages, such as the Structured Query Language ("SQL"), can be used to create a query.

As described herein, extraction rules can be used to extract field-value pairs or field values from data. An extraction rule can comprise one or more regex rules that specify how to extract values for the field corresponding to the extraction rule. In addition to specifying how to extract field values, the extraction rules may also include instructions for deriving a field value by performing a function on a character string or value retrieved by the extraction rule. For example, an extraction rule may truncate a character string or convert the character string into a different data format. Extraction rules can be used to extract one or more values for a field from events by parsing the portions of machine data in the events and examining the data for one or more patterns of characters, numbers, delimiters, etc., that indicate where the field begins and, optionally, ends. In certain embodiments, extraction rules can be stored in one or more configuration files. In some cases, a query itself can specify one or more extraction rules.

In some cases, extraction rules can be applied at data ingest by the intake system 110 and/or indexing system 112. For example, the intake system 110 and indexing system 112 can apply extraction rules to ingested data and/or events generated from the ingested data and store results in an inverted index.

The system 102 advantageously allows for search time field extraction. In other words, fields can be extracted from the event data at search time using late-binding schema as opposed to at data ingestion time, which was a major limitation of the prior art systems. Accordingly, extraction rules can be applied at search time by the query system 114. The query system can apply extraction rules to events retrieved from the storage system 116 or data received from sources external to the system 102. Extraction rules can be applied to all the events in the storage system 116 or to a subset of the events that have been filtered based on some filter criteria (e.g., event timestamp values, etc.).

Figure 4C:
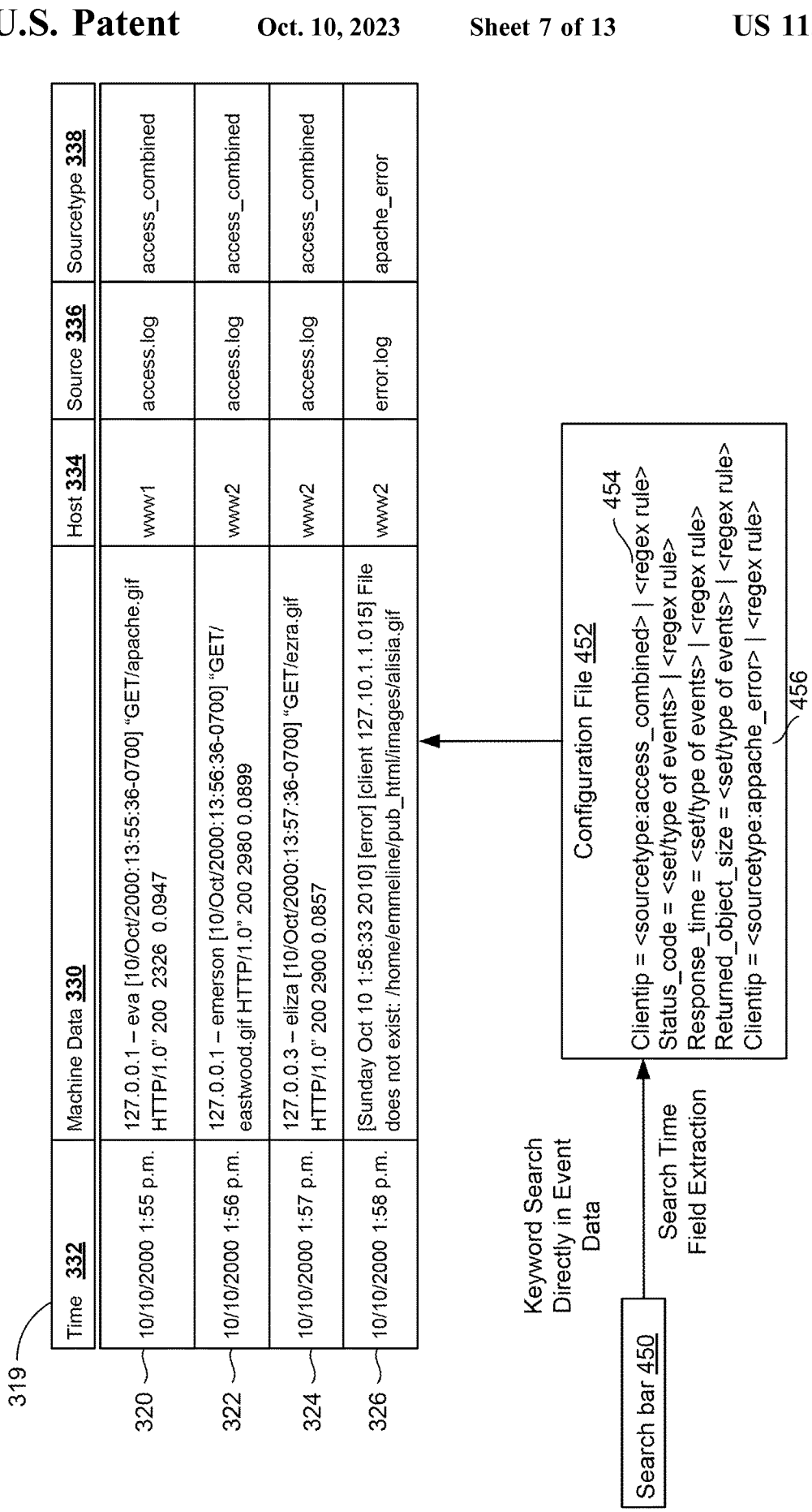
FIG. 4C is a block diagram illustrating an embodiment of a configuration file that includes various extraction rules that can be applied to events.

FIG. 4C is a block diagram illustrating an embodiment of the table 319 showing events 320-326, described previously with reference to FIG. 3B. As described herein, the table 319 is for illustrative purposes, and the events 320-326 may be stored in a variety of formats in an event data file 316 or raw record data store. Further, it will be understood that the event data file 316 or raw record data store can store millions of events. FIG. 4C also illustrates an embodiment of a search bar 450 for entering a query and a configuration file 452 that includes various extraction rules that can be applied to the events 320-326.

As a non-limiting example, if a user inputs a query into search bar 450 that includes only keywords (also known as "tokens"), e.g., the keyword "error" or "warning," the query system 114 can search for those keywords directly in the events 320-326 stored in the raw record data store.

As described herein, the indexing system 112 can optionally generate and use an inverted index with keyword entries to facilitate fast keyword searching for event data. If a user searches for a keyword that is not included in the inverted index, the query system 114 may nevertheless be able to retrieve the events by searching the event data for the keyword in the event data file 316 or raw record data store directly. For example, if a user searches for the keyword "eva," and the name "eva" has not been indexed at search time, the query system 114 can search the events 320-326 directly and return the first event 320. In the case where the keyword has been indexed, the inverted index can include a reference pointer that will allow for a more efficient retrieval of the event data from the data store. If the keyword has not been indexed, the query system 114 can search through the events in the event data file to service the search.

In many cases, a query include fields. The term "field" refers to a location in the event data containing one or more values for a specific data item. Often, a field is a value with a fixed, delimited position on a line, or a name and value pair, where there is a single value to each field name. A field can also be multivalued, that is, it can appear more than once in an event and have a different value for each appearance, e.g., email address fields. Fields are searchable by the field name or field name-value pairs. Some examples of fields are "clientip" for IP addresses accessing a web server, or the "From" and "To" fields in email addresses.

By way of further example, consider the query, "status=404." This search query finds events with "status" fields that have a value of "404." When the search is run, the query system 114 does not look for events with any other "status" value. It also does not look for events containing other fields that share "404" as a value. As a result, the search returns a set of results that are more focused than if "404" had been used in the search string as part of a keyword search. Note also that fields can appear in events as "key=value" pairs such as "user_name=Bob." But in most cases, field values appear in fixed, delimited positions without identifying keys. For example, the data store may contain events where the "user_name" value always appears by itself after the timestamp as illustrated by the following string: "November 15 09:33:22 evaemerson."

FIG. 4C illustrates the manner in which configuration files may be used to configure custom fields at search time in accordance with the disclosed embodiments. In response to receiving a query, the query system 114 determines if the query references a "field." For example, a query may request a list of events where the "clientip" field equals "127.0.0.1." If the query itself does not specify an extraction rule and if the field is not an indexed metadata field, e.g., time, host, source, sourcetype, etc., then in order to determine an extraction rule, the query system 114 may, in one or more embodiments, locate configuration file 452 during the execution of the query.

Configuration file 452 may contain extraction rules for various fields, e.g., the "clientip" field. The extraction rules may be inserted into the configuration file 452 in a variety of ways. In some embodiments, the extraction rules can comprise regular expression rules that are manually entered in by the user.

In one or more embodiments, as noted above, a field extractor may be configured to automatically generate extraction rules for certain field values in the events when the events are being created, indexed, or stored, or possibly at a later time. In one embodiment, a user may be able to dynamically create custom fields by highlighting portions of a sample event that should be extracted as fields using a graphical user interface. The system can then generate a regular expression that extracts those fields from similar events and store the regular expression as an extraction rule for the associated field in the configuration file 452.

In some embodiments, the indexing system 112 can automatically discover certain custom fields at index time and the regular expressions for those fields will be automatically generated at index time and stored as part of extraction rules in configuration file 452. For example, fields that appear in the event data as "key=value" pairs may be automatically extracted as part of an automatic field discovery process. Note that there may be several other ways of adding field definitions to configuration files in addition to the methods discussed herein.

Events from heterogeneous sources that are stored in the storage system 116 may contain the same fields in different locations due to discrepancies in the format of the data generated by the various sources. For example, event 326 also contains a "clientip" field, however, the "clientip" field is in a different format from events 320, 322, and 324.

Furthermore, certain events may not contain a particular field at all. To address the discrepancies in the format and content of the different types of events, the configuration file 452 can specify the set of events to which an extraction rule applies. For example, extraction rule 454 specifies that it is to be used with events having a sourcetype "access_combined," and extraction rule 456 specifies that it is to be used with events having a sourcetype "apache_error." Other extraction rules shown in configuration file 452 specify a set or type of events to which they apply. In addition, the extraction rules shown in configuration file 452 include a regular expression for parsing the identified set of events to determine the corresponding field value. Accordingly, each extraction rule may pertain to only a particular type of event. Accordingly, if a particular field, e.g., "clientip" occurs in multiple types of events, each of those types of events can have its own corresponding extraction rule in the configuration file 452 and each of the extraction rules would comprise a different regular expression to parse out the associated field value. In some cases, the sets of events are grouped by sourcetype because events generated by a particular source can have the same format.

The field extraction rules stored in configuration file 452 can be used to perform search-time field extractions. For example, for a query that requests a list of events with sourcetype "access_combined" where the "clientip" field equals "127.0.0.1," the query system 114 can locate the configuration file 452 to retrieve extraction rule 454 that allows it to extract values associated with the "clientip" field from the events where the sourcetype is "access_combined" (e.g., events 320-324). After the "clientip" field has been extracted from the events 320, 322, 324, the query system 114 can then apply the field criteria by performing a compare operation to filter out events where the "clientip" field does not equal "127.0.0.1." In the example shown in FIG. 4C, the events 320 and 322 would be returned in response to the user query. In this manner, the query system 114 can service queries with filter criteria containing field criteria and/or keyword criteria.

It should also be noted that any events filtered by performing a search-time field extraction using a configuration file 452 can be further processed by directing the results of the filtering step to a processing step using a pipelined search language. Using the prior example, a user can pipeline the results of the compare step to an aggregate function by asking the query system 114 to count the number of events where the "clientip" field equals "127.0.0.1."

By providing the field definitions for the queried fields at search time, the configuration file 452 allows the event data file or raw record data store to be field searchable. In other words, the raw record data store can be searched using keywords as well as fields, wherein the fields are searchable name/value pairings that can distinguish one event from another event and can be defined in configuration file 452 using extraction rules. In comparison to a search containing field names, a keyword search may result in a search of the event data directly without the use of a configuration file.

Further, the ability to add schema to the configuration file 452 at search time results in increased efficiency and flexibility. A user can create new fields at search time and simply add field definitions to the configuration file 452. As a user learns more about the data in the events, the user can continue to refine the late-binding schema by adding new fields, deleting fields, or modifying the field extraction rules in the configuration file for use the next time the schema is used by the system 102. Because the system 102 maintains the underlying raw data and uses late-binding schema for searching the raw data, it enables a user to continue investigating and learn valuable insights about the raw data long after data ingestion time. Similarly, multiple field definitions can be added to the configuration file to capture the same field across events generated by different sources or sourcetypes. This allows the system 102 to search and correlate data across heterogeneous sources flexibly and efficiently.

The system 102 can use one or more data models to search and/or better understand data. A data model is a hierarchically structured search-time mapping of semantic knowledge about one or more datasets. It encodes the domain knowledge used to build a variety of specialized searches of those datasets. Those searches, in turn, can be used to generate reports.

The above-described system provides significant flexibility by enabling a user to analyze massive quantities of minimally-processed data "on the fly" at search time using a late-binding schema, instead of storing pre-specified portions of the data in a database at ingestion time. This flexibility enables a user to see valuable insights, correlate data, and perform subsequent queries to examine interesting aspects of the data that may not have been apparent at ingestion time.

Performing extraction and analysis operations at search time can involve a large amount of data and require a large number of computational operations, which can cause delays in processing the queries. In some embodiments, the system 102 can employ a number of unique acceleration techniques to speed up analysis operations performed at search time. These techniques include: performing search operations in parallel using multiple components of the query system 114, using an inverted index 118, and accelerating the process of generating reports.

To facilitate faster query processing, a query can be structured such that multiple components of the query system 114 (e.g., search nodes) perform the query in parallel, while aggregation of search results from the multiple components is performed at a particular component (e.g., search head). For example, consider a scenario in which a user enters the query "Search "error" stats count BY host." The query system 114 can identify two phases for the query, including: (1) subtasks (e.g., data retrieval or simple filtering) that may be performed in parallel by multiple components, such as search nodes, and (2) a search results aggregation operation to be executed by one component, such as the search head, when the results are ultimately collected from the search nodes.

Based on this determination, the query system 114 can generate commands to be executed in parallel by the search nodes, with each search node applying the generated commands to a subset of the data to be searched. In this example, the query system 114 generates and then distributes the following commands to the individual search nodes: "Search "error" prestats count BY host." In this example, the "prestats" command can indicate that individual search nodes are processing a subset of the data and are responsible for producing partial results and sending them to the search head. After the search nodes return the results to the search head, the search head aggregates the received results to form a single search result set. By executing the query in this manner, the system effectively distributes the computational operations across the search nodes while reducing data transfers. It will be understood that the query system 114 can employ a variety of techniques to use distributed components to execute a query. In some embodiments, the query system 114 can use distributed components for only mapping functions of a query (e.g., gather data, applying filter criteria, etc.). In certain embodiments, the query system 114 can use distributed components for mapping and reducing functions (e.g., joining data, combining data, reducing data, etc.) of a query.

4.0. Example Use Cases

The system 102 provides various schemas, dashboards, and visualizations that simplify developers' tasks to create applications with additional capabilities, including but not limited to security, data center monitoring, IT service monitoring, and client/customer insights.

An embodiment of an enterprise security application is as SPLUNK® ENTERPRISE SECURITY, which performs monitoring and alerting operations and includes analytics to facilitate identifying both known and unknown security threats based on large volumes of data stored by the system 102. The enterprise security application provides the security practitioner with visibility into security-relevant threats found in the enterprise infrastructure by capturing, monitoring, and reporting on data from enterprise security devices, systems, and applications. Through the use of the system 102 searching and reporting capabilities, the enterprise security application provides a top-down and bottom-up view of an organization's security posture.

An embodiment of an IT monitoring application is SPLUNK® IT SERVICE INTELLIGENCE™, which performs monitoring and alerting operations. The IT monitoring application also includes analytics to help an analyst diagnose the root cause of performance problems based on large volumes of data stored by the system 102 as correlated to the various services an IT organization provides (a service-centric view). This differs significantly from conventional IT monitoring systems that lack the infrastructure to effectively store and analyze large volumes of service-related events. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, an IT monitoring application system stores large volumes of minimally-processed service-related data at ingestion time for later retrieval and analysis at search time, to perform regular monitoring, or to investigate a service issue. To facilitate this data retrieval process, the IT monitoring application enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the events that pertains to the entity, whether produced by the entity itself or by another machine, and considering the many various ways the entity may be identified in machine data (such as by a URL, an IP address, or machine name). The service and entity definitions can organize events around a service so that all of the events pertaining to that service can be easily identified. This capability provides a foundation for the implementation of Key Performance Indicators.

As described herein, the system 102 can receive heterogeneous data from disparate systems. In some cases, the data from the disparate systems may be related and correlating the data can result in insights into client or customer interactions with various systems of a vendor. To aid in the correlation of data across different systems, multiple field definitions can be added to one or more configuration files to capture the same field or data across events generated by different sources or sourcetypes. This can enable the system 102 to search and correlate data across heterogeneous sources flexibly and efficiently.

Figure 4D:
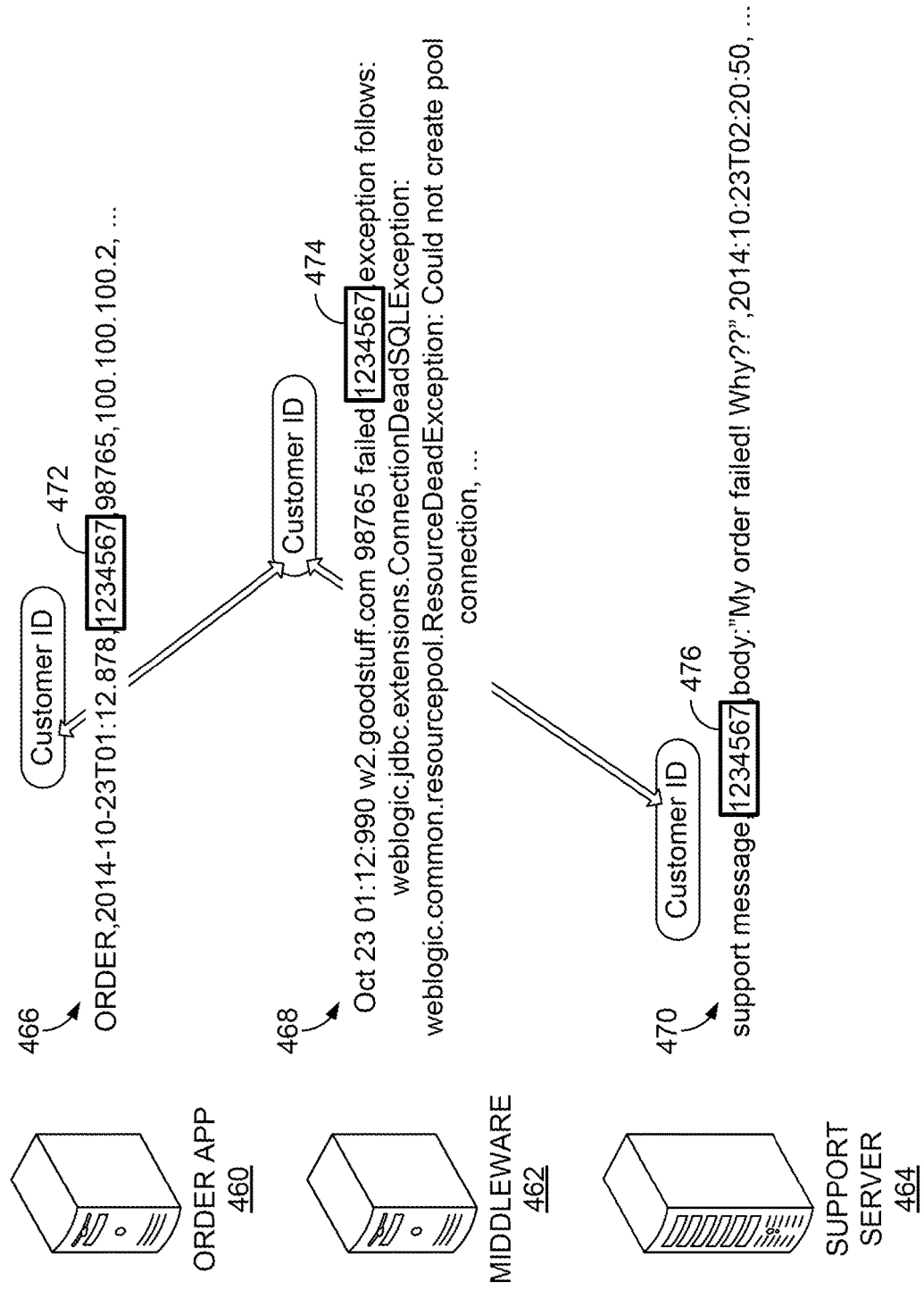
FIG. 4D is a block diagram illustrating an example scenario where a common customer identifier is found among log data received from disparate data sources.

As a non-limiting example and with reference to FIG. 4D, consider a scenario in which a common customer identifier is found among log data received from three disparate data sources. In this example, a user submits an order for merchandise using a vendor's shopping application program 460 running on the user's system. In this example, the order was not delivered to the vendor's server due to a resource exception at the destination server that is detected by the middleware code 462. The user then sends a message to the customer support server 464 to complain about the order failing to complete. The three systems 460, 462, 464 are disparate systems that do not have a common logging format. The shopping application program 460 sends log data 466 to the system 102 in one format, the middleware code 462 sends error log data 468 in a second format, and the support server 464 sends log data 470 in a third format.

Using the log data received at the system 102 from the three systems 460, 462, 464, the vendor can uniquely obtain an insight into user activity, user experience, and system behavior. The system 102 allows the vendor's administrator to search the log data from the three systems 460, 462, 464, thereby obtaining correlated information, such as the order number and corresponding customer ID number of the person placing the order. The system 102 also allows the administrator to see a visualization of related events via a user interface. The administrator can query the system 102 for customer ID field value matches across the log data from the three systems 460, 462, 464 that are stored in the storage system 116. While the customer ID field value exists in the data gathered from the three systems 460, 462, 464, it may be located in different areas of the data given differences in the architecture of the systems. The query system 114 obtains events from the storage system 116 related to the three systems 460, 462, 464. The query system 114 then applies extraction rules to the events in order to extract field values for the field "customer ID" that it can correlate. As described herein, the query system 114 may apply a different extraction rule to each set of events from each system when the event format differs among systems. In this example, a user interface can display to the administrator the events corresponding to the common customer ID field values 472, 474, and 476, thereby providing the administrator with insight into a customer's experience. The system 102 can provide additional user interfaces and reports to aid a user in analyzing the data associated with the customer.

5.0. Architecture Specific Description

The present disclosure describes techniques for improving the reliability of searches performed by the data intake and query system. The results obtained by the data intake and query system from executing a search query may be compromised due to various factors. For example, the results obtained for a search query may be incomplete. This can occur, for instance, when a search process that executes the search query is impacted or stopped due to runtime issues like network bottlenecks, process interruptions, server downtime, and the like. The problem is further aggravated when multiple components (e.g., multiple search peers) are used to execute the search query. Each individual search peer may be configured to execute a portion of the search (e.g., search a certain range of data), with the search results returned by the individual search peers being aggregated to form the overall result for the search query. In such a scenario, one or more search peers may fail by not returning any result or returning only a partial result. The overall search result that is based upon a sum or aggregation of results returned by the search peers to a search head is thus also compromised since it may not represent a full result. In certain situations, the search head may also fail in the middle of aggregating results received from the search peers. When such a result is presented to a user or other consumer of the result, the consumer may not even be aware that the result does not represent a full search result. This becomes especially problematic in situations where a search query is scheduled to execute periodically (e.g., a cron job), with each query execution run configured to search and query events in a particular time window or time period, and where the time periods associated with the periodic execution of the query are not completely overlapping. In such a scenario, the execution of a particular search query at a particular time and for querying events within a particular time period may fail (e.g., get stuck, fail to deliver its search results, is not able to connect to the data store storing the data to be searched) and return only a partial result to a consumer of the search result. Since the next execution of the search query, which executes consecutively after the previous execution of the search query, is configured to search for events in a different time period from the particular time period of the particular query, the events in the particular time period associated with the failed execution of the search query are never properly searched. In such a situation, even though the consumer continues to receive periodic search results, at least one or more of the results are not reliable since they are incomplete. Existing search techniques are limited in their abilities to track the time periods or events that are searched and those that are not, resulting in events being missed from the searches. This may not be acceptable to the consumer of the search results.

The present disclosure describes techniques that improve the reliability of searches performed by the data intake and query system, especially for searches that are scheduled to execute periodically. This is achieved by enabling the data intake and query system to accurately track event data that was successfully searched and event data that was not successfully searched. Tracking an event that was successfully searched implies that an event was searched and counted only once. In other words, the event was not lost (missed from the search) or counted more than once (i.e., a duplicate event). In certain implementations, the data intake and query system monitors the result returned from execution of a search query and determines whether the search query returned a full result and was thus successfully completed or returned only a partial result and was thus unsuccessful. Based upon the monitoring, the data intake and query system stores reference information indicative of which event data was successfully searched and which data was not. Since each event being searched by the data intake and query system has at least one associated time stamp (e.g., originating, tagging or arrival timestamp), in certain implementations, this reference information (also referred to as a cursor or cursor object) stores information identifying a time point ("reference time point") that is indicative of event data that has been successfully searched by the search query, and thus also indicative of event data that has not been searched. For example, events with associated time stamps before the reference time point are considered successfully searched, and those at and after are considered not successfully searched. In the case of a failed execution of a search query, no search results may be output to the user or consumer, even though partial results may have been obtained as a result of executing the search query.

When the next execution of the search query takes place, the data intake and query system uses the reference time information to determine a starting time point for the next execution of the search query. In this manner, the time period for the search query includes events that were not successfully searched during previous executions of the search query. If the next execution of the search query completes successfully, then the data intake and query system updates the reference time information to a time point indicative of events that were successfully searched. This reference time information can then be used when the next search is executed by the data intake and query system. If the next execution of the search query fails, then the data intake and query system does not update the reference time information such that the reference time point continues to be indicative of events that were successfully searched.

In this manner, the data intake and query system automatically maintains reference time information indicative of which events were successfully searched, and this reference time information is used to determine a time period to be used for the next search, where the start time of the time period is based upon the reference time point indicated by the reference time information. This ensures reliable search results as all events are properly searched without any event loss and event duplicates. Further, search results are output to the user or consumer only when the search query is successful. Any partial results are not output. This further ensures that the user or consumer only receives reliable results. This also prevents duplicate results from being output to the user. This guarantees that the data intake and query system reliably delivers to the user every single event that meets the search filters specified by the search query, thus making the searches very durable.

The following example further illustrates the principles described herein. Assume that the reference time information (cursor) specifies a reference time point t0. Further, assume that the data intake and query system is about to execute a search query at a first execution time ("first execution of the search query"). In preparing the search query for execution at the first execution time, the data intake and query system computes a first time period for the search query, where the first time period determines which events will be searched by the search query—only events falling within the first time period are searched by the search query. The first time period is characterized by a first start time and a first end time. The data intake and query system computes the first start time based upon the reference time information. In certain implementations, the first start time is set to the reference time point (value=t0) specified by the reference time information. The first end time may be set to the time of execution of the search query. The data intake and query system then executes the search query and, based upon the result obtained from execution of the search query, determines whether the search query was successful or unsuccessful. If the search query is determined to be successful, then the data intake and query system updates the reference time information, such as by setting the reference time point to the first end time. If the search query is determined to be unsuccessful, then the reference time information is not updated (i.e., the value is still t0) and no search results are output to the user, even if the search query yielded partial results. The process is then repeated for the execution of the search query at a second execution time ("second execution of the search query") after the first execution of the search query. The data intake and query system computes the start time of the time period for the second execution of the search query based upon the reference time information. In certain implementations, if the first execution of the search query was unsuccessful, then the reference time point still has the value t0, and the start time of the time period for the second execution of the search query is set to t0. If the first execution of the search query was successful, then the reference time point has the value "first end time," and the start time of the time period for the second execution of the search query is set to first end time. In this manner, no event is missed even when a search is not successful thereby increasing the reliability of results produced by the search query and making the searches durable.

In a certain implementation, if an event has an associated time of "first end time," the event is included either in the first execution of the search query or a subsequent (second) execution of the search query, but not both the first and the second execution. This depends on whether the start time of the search query is inclusive or exclusive. For instance, if the start time is inclusive and the end time is exclusive, a first execution of the search query that is scheduled to execute at 11.30 AM (and searching for events falling in a first time period, 11.00 AM-11.30 AM) would not include an event that is at 11.30 AM. This event is included in a second (subsequent) execution of the search query. If the start time is exclusive and the end time is inclusive, the first execution of the search query that is scheduled to execute at 11.30 AM would include the event that is at 11.30 AM.

Figure 5:
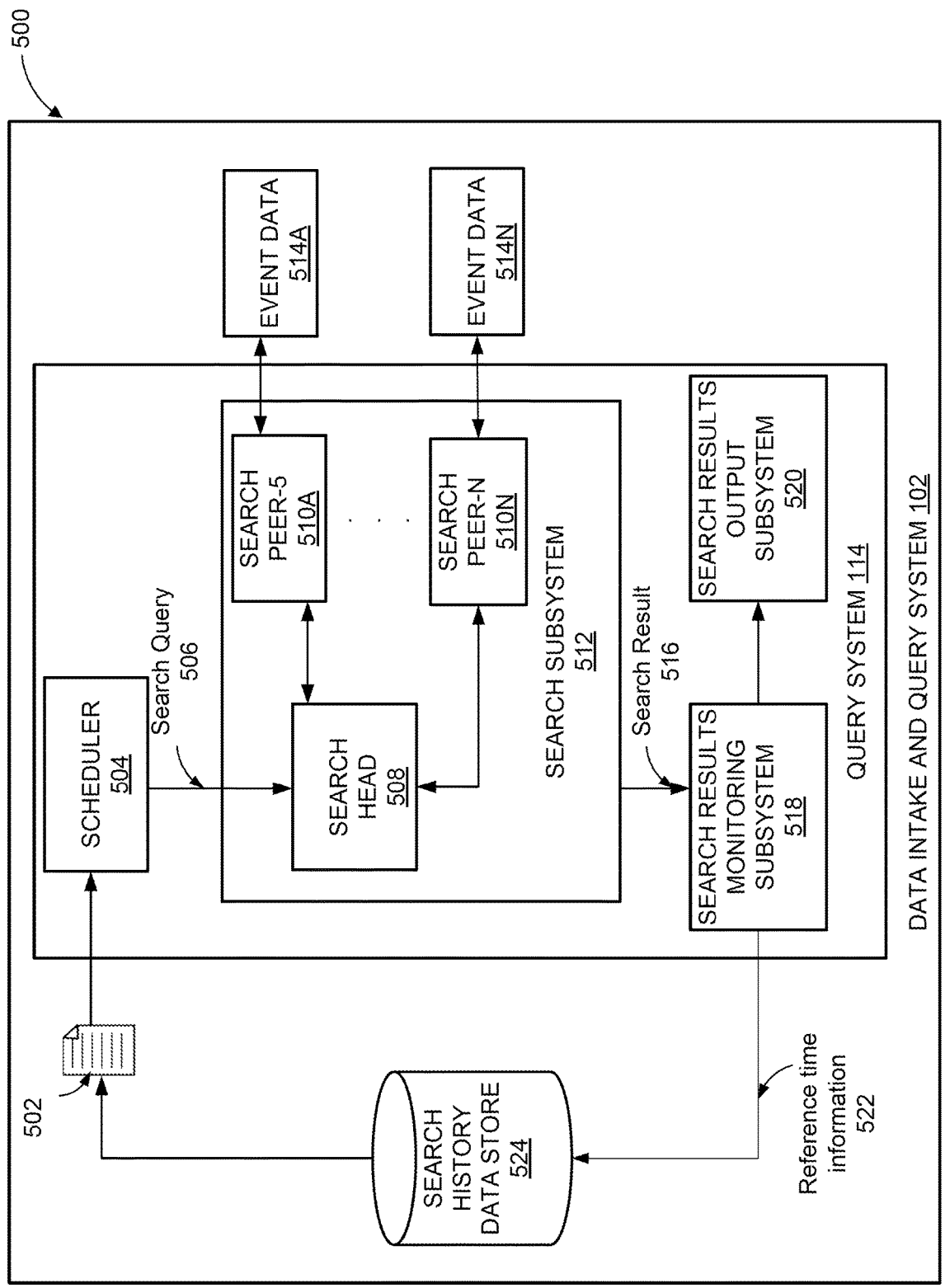
FIG. 5 is a simplified block diagram showing components within the query system 114 that are responsible for providing the search capabilities describe herein in certain implementations.

In certain implementations, the reliable and durable search functionalities may be implemented in the query system of the data intake and query system, such as in query system 114 of data intake and query system 102 depicted in FIG. 1. FIG. 5 is a simplified block diagram showing components within the query system 114 that are responsible for providing the search capabilities describe herein in certain implementations. The query system 114 may be implemented using only software, only hardware, or combinations thereof. In certain implementations, the query system 114 is implemented by one or more computing systems that execute computer-readable instructions (e.g., code, program) to implement the query system 114. As depicted in FIG. 5, the query system 114 includes various subsystems including a scheduler 504, a search subsystem 512, a search results monitoring subsystem 518, and a search results output subsystem 520. Portions of data or information used by or generated by the query system 114 as part of its processing may be stored in a persistent memory such as a search history data store 524. The subsystems depicted in FIG. 5 may be implemented using only software (e.g., code, instructions, program) executed by one or more processing units (e.g., processors, cores) of a computing system, hardware, or combinations thereof. The software may be stored on a non-transitory storage medium (e.g., on a memory device) and be executable by one or more processors.

Computing environment 500 depicted in FIG. 1 is merely an example and is not intended to unduly limit the scope of claimed embodiments. One of ordinary skill in the art would recognize many possible variations, alternatives, and modifications. For example, in some implementations, the query system 114 can be implemented using more or fewer subsystems than those shown in FIG. 1, may combine two or more subsystems, or may have a different configuration or arrangement of subsystems.

In certain embodiments, one or more of the components of the query system 114 can be implemented in a shared computing resource environment. In this context, a shared computing resource environment or cloud-based service can refer to a service hosted by one more computing resources that are accessible to end users over a network, for example, by using a web browser or other application on a client device to interface with the remote computing resources. For example, a service provider may provide a query system 114 by managing computing resources configured to implement various aspects of the system (e.g., scheduler 504, search subsystem 512, search results monitoring subsystem 518 and search results output subsystem 520) and by providing access to the system to end users via a network. Typically, a user may pay a subscription or other fee to use such a service. Each subscribing user of the cloud-based service may be provided with an account that enables the user to configure a customized cloud-based system based on the user's preferences.

When implemented in a shared computing resource environment, the underlying hardware (non-limiting examples: processors, hard drives, solid-state memory, RAM, etc.) on which the components of the query system 114 execute can be shared by multiple customers or tenants as part of the shared computing resource environment. In addition, when implemented in a shared computing resource environment as a cloud-based service, various components of the system 114 can be implemented using containerization or operating-system-level virtualization, or other virtualization technique. For example, one or more components of the scheduler 504, search subsystem 512, search results monitoring subsystem 518 and search results output subsystem 520 can be implemented as separate software containers or container instances. Each container instance can have certain computing resources (e.g., memory, processor, etc.) of an underlying hosting computing system (e.g., server, microprocessor, etc.) assigned to it, but may share the same operating system and may use the operating system's system call interface. Each container may provide an isolated execution environment on the host system, such as by providing a memory space of the hosting system that is logically isolated from memory space of other containers. Further, each container may run the same or different computer applications concurrently or separately, and may interact with each other. Although reference is made herein to containerization and container instances, it will be understood that other virtualization techniques can be used. For example, the components can be implemented using virtual machines using full virtualization or para virtualization, etc. Thus, where reference is made to "containerized" components, it should be understood that such components may additionally or alternatively be implemented in other isolated execution environments, such as a virtual machine environment.

Implementing the system 114 in a shared computing resource environment can provide a number of benefits. In some cases, implementing the system 114 in a shared computing resource environment can make it easier to install, maintain, and update the components of the system 114. For example, rather than accessing designated hardware at a particular location to install or provide a component of the system 114, a component can be remotely instantiated or updated as desired. Similarly, implementing the system 114 in a shared computing resource environment or as a cloud-based service can make it easier to meet dynamic demand. For example, if the system 114 experiences significant load at indexing or search, additional compute resources can be deployed to process the additional data or queries. In an "on-premises" environment, this type of flexibility and scalability may not be possible or feasible.

In addition, by implementing the system 114 in a shared computing resource environment or as a cloud-based service can improve compute resource utilization. For example, in an on-premises environment if the designated compute resources are not being used by, they may sit idle and unused. In a shared computing resource environment, if the compute resources for a particular component are not being used, they can be re-allocated to other tasks within the system 114 and/or to other systems unrelated to the system 114.

In the example depicted in FIG. 5, scheduler 504 determines when a search query is to be executed, prepares the search query for execution, and then dispatches the search query to the search subsystem 512 for execution. In certain implementations, the scheduler 504 determines when a search query is to be executed based upon configuration information 502, which may indicate information on when the search query is to be executed. For example, the configuration information 502 may contain information related to a periodic search job (e.g., a cron job), where the information may identify the periodicity (i.e., the time period between different executions of the search query) of the search query. The configuration information 502 may also indicate a time period or range to be associated with each execution of the search query, where events having associated with time stamps falling within the time period are searched by the search query. The configuration information 502 may also specify other information related to the search query such as the search criteria to be used for searching where an event matching the search criteria is returned upon executing the search query, data sources to be searched, the processing to be applied to the search results, one or more consumers to whom the search results are to be forwarded, and other search-related information. The configuration information 502 may identify a schedule for executing the search query at periodic time intervals. For example, the configuration information 502 may specify a periodic search job where a search query is to be executed every 30 minutes and search events with an associated time stamps falling within 30 minutes from the execution time of the search query. The configuration information may also identify processing, if any, to be performed on the search query results (e.g., statistical analysis of the search results) and the consumers to whom the results are to be forwarded. The configuration information 502 may also specify the data sources to be searched, such as specific indexed event data that is to be searched.

In certain implementations, the configuration information 502 may also specify whether a search query is durable or not. A user-configurable option may be stored in the configuration information 502 that can be set by the user to indicate whether the search query is to be treated as a durable search query or not. For example, a key-value pair may be stored as part of configuration information 502, where the key identifies the durable search option and the value can be set to "yes" to enable the option or "no" to disable the option.

The configuration information 502 may be stored in various different formats such as a search query configuration file, a database, and the like. In certain implementations, the configuration information 502 may be stored in a database that stores search related information, such as in search history data store 524.

In certain examples, information in the configuration information 502 may be specified or configured by an administrator/user of the system 102. This information may be, for example, configured by the user via one or more user interfaces provided by the data intake and query system 102 when the scheduled search job is set up. An example of such an interface and the various search settings that may be specified are described below.

In certain implementations, the search history data store 524 is configured to store information about previous executions of the search query. For example, the reference time information (cursor information) for a search job may be stored in search history data store 524. The reference time information may specify a reference time point that tracks and is indicative of which events have been successfully searched. In certain implementations, the reference time information may be stored in the configuration information 502.

While several of the examples in this disclosure describe multiple executions of a search query being scheduled and executed based upon a configured periodic search job, this is not intended to be limiting. In certain implementations, the search query may also be executed manually by a user. The teachings described herein and the claimed embodiments are applicable to a search query executed per a scheduled search job, to a manually executed query, or combinations thereof.

The scheduler 504 uses the configuration information 502 to determine when a search query is to be executed. The scheduler 504 then prepares the search query for execution. As part of this preparation, the scheduler 504 may determine a time when the search query is to be executed. The scheduler 504 may also determine a time period for the search query, where the time period identifies a range or window of time indicative of events that are to be searched by the search query. In certain implementations, for a time period associated with a search query, the search query searches and queries only those events with associated time stamps falling within that time period. The time period for a search query is characterized by a start time and an end time. The scheduler 504 computes the time period for a search based upon information in the configuration information 502 and also based upon the reference time information in data store 524. In certain implementations, the start time for the search query to be executed is set to the reference time point identified in the reference time information and the end time of the time period is set based upon when the search query is to be executed (e.g., may be set to the time of execution of the search query).

Once a search query has been prepared for execution, the scheduler 504 then dispatches or forwards the search query 506 to the search subsystem 512 for execution. In the example depicted in FIG. 5, the search subsystem 512 comprises a search head 508 and a set of search peers 510A-510N. In an alternate implementation, the search subsystem 512 may also be implemented as a standalone server that communicates with the search head and the set of search peers. The search query is received from the scheduler 504 by the search head 508. The search head 508 then identifies a set of one or more search peers 510A-510N that are available for executing the search query. Based upon the available search peers, the search head 508 may subdivide the search query into sub-queries and forward the sub-queries to the search peers for execution, where each search peer receives a particular sub-query for execution. In certain examples, the time period associated with the search query is broken into non-overlapping sub-time periods, and a sub-time period is associated with a sub-query. For example, if the time period covers 30 minutes, and there are three search peers available, the first search peer may receive a first sub-query associated with the first 10 minutes of the 30 minutes time period, the second search peer may receive a second sub-query associated with the next 10 minutes of the 30 minutes time period, and the third search peer may receive a third sub-query associated with the last 10 minutes of the 30 minutes time period. In alternate examples, the first search peer may be configured to query events stored in a first database or a first dataset, the second search peer may be configured to query events stored in a second database or a second dataset and a third search peer may be configured to query events stored in a third database or a third dataset.

The search peers are then configured to execute the sub-queries at the scheduled time of execution of the search query. In certain implementations, the searches performed by the search peers may be executed concurrently, while in other implementations the sub-queries may be executed in a serialized manner, or yet in other embodiments, some combination of concurrent and serialized execution may be used. Each search peer is configured to search event data (e.g., 514A) and communicate results obtained from execution of the subquery to the search head 508. The search head 508 aggregates the results from the multiple search peers to produce an overall final result 516 for the search query 506. The search subsystem 512 then transmits the search result 516 to the search results monitoring subsystem 518.

The search results monitoring subsystem 518 is configured to determine whether the search query 506 was successful or unsuccessful (i.e., failed) and based upon the determination update the reference time information for the search. In certain implementations, the monitoring subsystem 518 monitors each of the search peers and the search head to determine if the searches performed by the peers were successful (i.e., the search peer was able to search all the events corresponding to the sub-time period associated with the sub-query allocated to that search peer and return the results to the search head 508). If the monitoring subsystem 518 determines that any search peer was unable to perform a search allocated to the search peer or could not complete the search, then the entire search query execution is tagged as having failed. The search results monitoring subsystem 518 updates the reference time information 522 based upon the determination of whether the execution of the search query was a success or a failure. If the execution of the search query is determined to have failed, then the reference time point in the reference time information is not updated. If the execution of the search query is determined to have succeeded, then the monitoring system 518 updates the reference time information to indicate event data that has been successfully searched. In certain implementations, the monitoring system updates the reference time point to the end time of the time period associated with the search query that was executed. The reference time information is then used by the scheduler 504 for computing the time period for the next execution of the search query that is part of the same search job.

The monitoring subsystem 518 is also responsible for controlling whether any results obtained from execution of the search query is to be output to the user or intended consumer of the search results. In certain examples, the search result may be output to the user only if the search query, as a whole, is determined to be successful by the monitoring subsystem 518. Accordingly, if the search query is determined to have succeeded, then the search results are forwarded to output subsystem 520 (either by the search subsystem 512 or by the monitoring subsystem 518 (as shown in FIG. 5)) to be output to the user or downstream consumer of the search results.

Details related to the processing performed by the various systems and subsystems depicted in FIG. 5 is further described below with respect to the flowchart depicted in FIG. 6 and the accompanying description.

Figure 6:
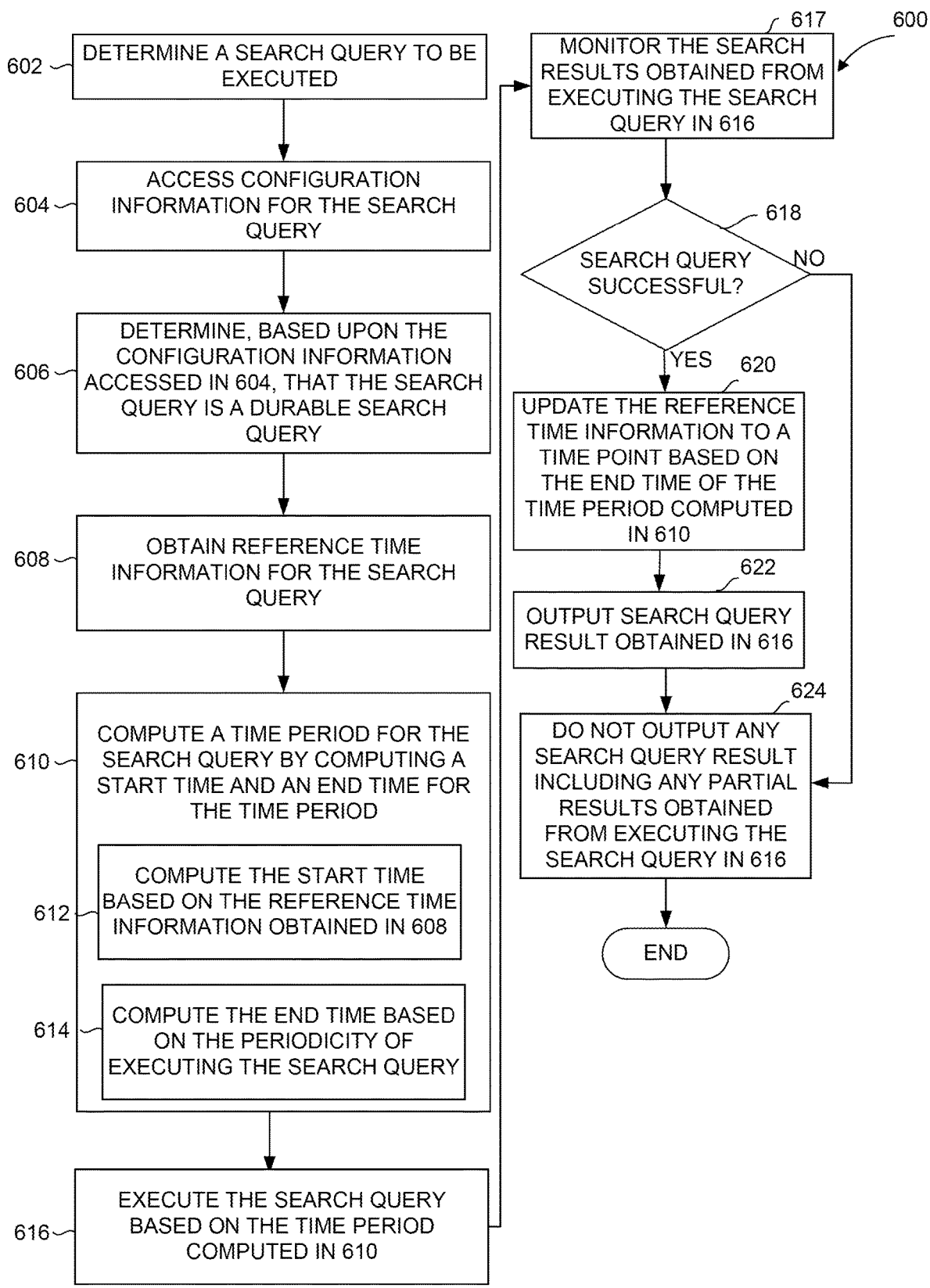
FIG. 6 is a simplified flow diagram illustrating a method for executing a search query according to some implementations.

FIG. 6 is a simplified flow diagram illustrating a method for executing a search query according to some implementations. The processing depicted in FIG. 6 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 600 presented in FIG. 6 and described below is intended to be illustrative and non-limiting. Although FIG. 6 depicts the various processing steps occurring in a particular sequence or order, this is not intended to be limiting. In certain alternative embodiments, the steps may be performed in some different order or some steps may also be performed in parallel. In certain embodiments, the processing depicted in FIG. 6 may be performed by the subsystems (504, 512, 518, 520) of the query system 114.

As an example, the search query execution depicted in FIG. 6 and described below may be for a search query being executed pursuant to a scheduled search job that is configured to execute a search query at periodic time intervals. This however is not intended to be limiting. The search query execution depicted in FIG. 6 and described below can also be part of a sequence of executions of the search query that are executed manually or ad hoc.

In the example depicted in FIG. 6, processing is initiated when, in block 602, the scheduler 104 determines a search query is to be executed. As previously described, the search query (e.g., 506) may be executed as part of a scheduled periodic search job. As part of 602, the scheduler 504 may access configuration information for the periodic search job and determine that it is time for a search query to be executed.

The scheduler may then prepare the search query for execution. For example, at block 604, the scheduler 504 may access configuration information 502 for the search query to determine parameters related to the search query. The configuration information may be stored in a memory location accessible to the scheduler 504. In a certain implementation, and as previously described, the configuration information may be stored in a configuration file, or other storage location. In yet some other implementations, the configuration information may also be stored in a database such as in the search history data store 524.

At block 606, the scheduler 504 determines, based on the configuration information accessed in block 604, whether the search query is a "durable" search query. In certain implementations, a durable search query is one where the reference time information is used to compute the time period to be associated with the search query, where only those events with associated time stamps falling within the time period are searched and queried by the search query. In certain implementations, information may be stored in the configuration information accessed in 604 that indicates whether the search query is a durable search or not. For example, a flag or other variable in the configuration information may be used to indicate whether the search query is a durable search query. For example, when the flag is set, it may indicate that the search query is to be a durable search query. The flag may be set for the periodic search job, such that when set to indicate a durable search query, any search query resulting from the search job is treated as a durable search query.

For the example depicted in FIG. 6 and described below, it is assumed that the search query is a durable search query. Upon determining that the search query is to be executed as a durable search query, at block 608, the scheduler 504 obtains the reference time information to be used for the search query to be executed. In certain examples, the reference time information is stored in the search history data store 524. In such a scenario, the scheduler 504 may read the reference time information from the database. In some other implementations, the same reference time information may also be stored as part of the configuration information accessed in 604. As described above, the reference time information indicates a reference time point that tracks event data that has already been successfully searched. The scheduler 504 uses this information to determine event data that is to be searched by the search query to be executed.

In a typical use case scenario, before even the first run for a search job, the reference time information may be set by an administrator or user configuring the durable search job. The reference time point may be set to a value that indicates the start time from which searching is to be performed for the first run of the search query. As described below in more detail, after each run of the search query (i.e., after each periodic execution of the search query per the period set by the search job), the reference time point value is updated depending upon whether the search query run was successful or unsuccessful.

In certain implementations of the data intake and query system, an event may have one or two time stamps associated with it representing two different time concepts—(1) event time—which identifies the time when the event occurred or the time when the event data was received by the data intake and query system and an event generated by the data intake and query system; and (2) indexed time—which identifies the time when the event was indexed by the data intake and query system. For example, an event may occur at the source host or be received or be generated by the data intake and query system at a first time point and this is represented by the event time stamp associated with the event. The same event may however be indexed by the data intake and query system at some later time point, which is represented by the indexed time stamp associated with the event. In this manner, the same event may have two different associated time stamps, one referring to the event time and the other referring to the indexed time. It is to be noted that, in a real world, events having the same event time (e.g., events that occurred or were generated at the same time point) may have different indexed times.

Since there can be two different types of time stamps associated with an event, the reference time point specified by the reference time information can refer to either event time or indexed time. In certain implementations, information (e.g., a flag or variable) is stored in the scheduled job configuration information to indicate whether the reference time information refers to event time or indexed time. An administrator or user of the scheduled search job can select whether the event time or indexed time is to be used for a durable search job.

Accordingly, as part of the processing in 608, the scheduler 504 not only obtains the reference time information value from the reference time information but only determines, based upon the configuration accessed in 604, whether the reference time information refers to event time or indexed time. Then, at block 610, the scheduler 504 computes a time period for the search query to be executed. The computed time period is characterized by a start time identifying the start time of the time period and an end time identifying the end time for the time period. As part of the processing in 610, the scheduler 504, at 612, computes the start time for the time period, and, at 614, computes the end time for the time period.

Since the search query is determined to be a durable search query in 606, at 612, the scheduler 504 computes the start time for the time period based upon the reference time point identified by the reference time information. As described above, the reference time point indicates the event data that was successfully searched and thus also indicates the start point of the event data that has not yet been searched and which is to be included in the search query to be executed. For example, if the reference time point is set to time tA and refers to indexed time, it indicates that events with associated indexed time stamps before tA have been successfully searched. The scheduler 504 uses the reference time point indicated by the reference time information to set the start time for the time period to be associated with the search query determined in 602 to be executed. In certain implementations, the start time is set to the reference time point value indicated in the reference time information.

At 614, the scheduler 504 computes the end point for the time period. In certain implementations, the end time is computed based upon the time of execution of the search query or based on the periodicity of executing the search query. For example, the end time be set to the time of execution of the search query. By way of example, if the configuration information for the scheduled search job indicates that a search query is to be executed every 30 minutes starting at 10 AM, and the search query determined in 602 represents a search query that is to be executed at 11:30 AM, then the end time for the time period for the search query may be set to 11:30 AM.

At block 616, the search query is executed based on the time period computed in block 610. In the example depicted in FIG. 5, the scheduler 504 forwards the search query to the search subsystem 512, which then executes the search query. The search query may be executed by a single component or by multiple components. For example, for the embodiment depicted in FIG. 5, the search subsystem 512 is configured to execute the search query. As previously described, the search query is received by a search head (508) which identifies a set of one or more search peers 510A-510N that are available for executing the search query. In certain examples, each search peer (e.g., 510A) may execute respective portions (i.e., sub-queries) of the search query concurrently and communicate results of their portion of the search query to the search head 508. The search head 508 may then combine the results from the search peers to produce a final result for the search query.

Various approaches may be utilized by the search subsystem 512 to execute the search query based on the time period computed for the search query. By way of example, for a search query that is identified as a first execution of the search query (i.e., a first run of the search query), the execution of the search query may involve executing, by one or more search peers (510A-510N), a set of one or more sub-queries. Each sub-query may execute respective portions of the search query concurrently and communicate results of their portion of the search query to the search head 508. For a second execution of the search query (i.e., a second run of the search query) that is executed after the first execution of the search query, the search query may be executed in one or more time periods. Additional details of the manner in which a second execution of the search query is performed is described in detail below.

At block 617, the search results obtained from executing the search query are monitored. For example, for the embodiment depicted in FIG. 5, the results obtained by search subsystem 512 are monitored by the search results monitoring subsystem 518. In certain implementations, results obtained by each of the search peers 510A-510N are monitored by the search results monitoring subsystem 518.

At block 618, based upon the monitoring in 617, a determination is made whether the execution of the search query in 616 was successful or unsuccessful (a failure). In certain examples, the execution of the search query is considered successful upon determining that all the events that were to be searched by the search query (i.e., events with time stamps falling within the time period computed for the search query in 610) were accessed and successfully queried by the search query, and the results from the querying were successfully delivered to the search subsystem. Alternatively, if all the events that were to be searched by the search query (i.e., events with time stamps falling within the time period computed for the search query in 610) could not be all accessed and/or successfully queried by the search query, thus resulting in partial or no results being obtained by the search subsystem, then the search query execution is determined to be a failure. In situations where the search query is divided into multiple sub-search queries that are executed by multiple search components (e.g., by the multiple search peers 510A-510N depicted in FIG. 5), the search query execution is considered have failed if even one of the search peers could not search and query the events that the search peer was configured to search, resulting in no result or only a partial results being obtained from that search peer. This means that the search result obtained by the search subsystem 512 is also incomplete and the search query execution is marked as a failure.

If the search query execution is determined, in 618, to be successful then processing continues with block 620, else processing continues with block 624. Upon determining that the search query execution was successful, at block 620, the reference time information is updated to a new reference time point value that is indicative of event data that has been successfully searched by the execution of the search query. In certain implementations, the reference time information is set to a time point value based on the end time of the time period computed in 610. For example, the reference time point may be set to the end time of the time period. For the example depicted in FIG. 5, the processing in 620 may be performed by search results monitoring subsystem 518.

At block 622, the search result obtained from executing the search query is output to a user or consumer of the result. For example, for the embodiment depicted in FIG. 5, upon determining that the search query was successfully executed, the search results monitoring subsystem 518 may forward the search result to results output subsystem 520, which may then output the search result. There are various ways in which the result may be output. In certain examples, the search result may be output via a user interface of the data intake and query system 102. In certain other examples, the search result may be forwarded to a downstream consumer of the result, where the downstream consumer could be a user, a program, a process, or any other consumer of the result.

At block 624, upon determining that the search query execution has failed, no results are output for the search query, even if the search query execution resulted in any partial results. Any partial results obtained, for example, from executing one or more sub-queries corresponding to the search query, are suppressed. Since the search query was not successfully executed, the reference time information is also not changed or updated, and thus stays the same for the next execution of the search query.

The processing depicted in FIG. 6 is repeated for each execution of a search query. The search query executions may correspond to different runs of a scheduled periodic search job. For instance, the processing is repeated for the next run of a search query. The reference time point specified by the reference time information is used to determine the start time of the time period for the next run. The next run is then executed and the reference time information updated based upon the success of failure of the execution. In this manner, the reference time point in the reference time information keeps track of the event data that has been already successfully searched, and this time information is used for the next search query execution to ensure that no events are missed even if one or more of search query executions are unsuccessful. Further, by ensuring that a search query result is output only when the search query execution is successful, reliable results are provided to the user and no duplicates are provided.

As previously described, when a search query fails, the reference time information stays at the time of the last successful search. At the next run, the scheduler uses the saved reference time information to dispatch a new run of the search query. If it is successful, the reference time information moves forward. For previous failed searches, a type of backfill time interval (for e.g., a single backfill time interval or multiple backfill time intervals) is specified to execute the search query. When a search query run is specified using a backfill time interval, in one approach, the execution of the search query can be performed as a single search query execution during a time period that covers both the backfill time period and the additional time period. In another approach, the search query execution can be performed as two separate search query executions, a first search query execution for the backfill time period and a second search query execution for the additional time period.

In a certain implementation, a "backfill_type" setting may be used to specify the type of backfill time interval (backfill time period) to be used for executing a search query. For instance, if the backfill type is specified as "time_interval," multiple backfill jobs (in accordance with the cron schedule) may be performed. If the backfill type is specified as "time_whole," the execution of the search query can be performed as a single search query execution during a time period that covers both the backfill time period and the additional time period. Additional details of the manner in which backfill time intervals can be specified for executing a search query are described in relation to the configuration file associated with the search query described below.

The following example further illustrates the processing depicted in FIG. 6 and described above. For this example, the configuration information for a scheduled periodic search job may indicate that a search query is to be executed every 30 minutes starting at 8 AM and the search query is to cover a period of time of the last 30 minutes prior to the execution of the query. Table A shows seven runs of the search query and the associated state/data.

TABLE A

Example

| Value of RTP prior to execution (col 1) | Run # (col 2) | Search Query Execution time (col 3) | Start Time (col 4) | End Time (col 5) | Success/ Fail (col 6) | Result Output? (col 7) | Value of RTP after execution (col 8) |
|---|---|---|---|---|---|---|---|
| 7:30 AM | #1 | 8 AM | 7:30 AM | 8 AM | Success | Yes | 8 AM |
| 8 AM | #2 | 8:30 AM | 8 AM | 8:30 AM | Fail | No | 8 AM |
| 8 AM | #3 | 9 AM | 8 AM | 9 AM | Success | Yes | 9 AM |
| 9 AM | #4 | 9:30 AM | 9 AM | 9:30 AM | Fail | No | 9 AM |
| 9 AM | #5 | 10 AM | 9 AM | 10 AM | Fail | No | 9 AM |
| 9 AM | #6 | 10:30 AM | 9 AM | 10:30 AM | Success | Yes | 10:30 AM |
| 10:30 AM | #7 | 11 AM | 10:30 AM | 11 AM | Success | Yes | 11 AM |

The columns of Table A show the following information:
Col 1—the value of the reference time point (RTP) prior to execution of the run.
Col 2—the run number.
Col 3—the time of execution of the search query.
Col 4—the start time computed for the time period for the search query for that run.
Col 5—the end time computed for the time period for the search query for that run.
Col 6—whether the search query execution for that run was a success or a failure.
Col 7—whether any search result was output for the run.
Col 8—the value of reference time point after the run execution.

As shown in Table A, prior to the first run, the reference time point value is set to 7:30 AM. This value may have been set by a system administrator or a user who configures the periodic search job. For the first run, the execution time (col 3) of the search query is 8 AM. The start time (col 4) is computed based upon the reference time point (in col 1) and set to 7:30 AM. The end time (in col 5) for run #1 is set to 8 AM, based upon the execution time of the search query (in col 3). The first run (execution) of the search query was determined to be a success (as shown in col 7) and thus the search result obtained from execution of the search query was output, as shown in col 8. The value of reference time point is also updated to 8 AM to indicate that events with time stamps up to 8 AM have been successfully searched.

For run #2, the value of the reference time point prior to the run (col 1) is 8 AM, which is the value of the reference time point after the previous run. Run #2 is executed at 8:30 AM (col 2) and has an associated time period characterized by a start time of 8 AM (col 4) and an end time of 8:30 AM (col 5). The start time (col 4) is set to the value of reference time point prior to the execution of the run (shown in col 1) and the end time (col 5) is set to the execution time of the run. The execution of run #2 is determined to be a failure (as shown in col 6), and thus no search results are output for the run (as indicated in col 7) and the reference time point is not updated and remains the same at 8 AM (as shown in col 8).

For run #3, the value of the reference time point prior to the run (col 1) is 8 AM, which is the value of the reference time point after the previous run. Run #3 is executed at 9 AM (col 2) and has an associated time period characterized by a start time of 8 AM (col 4) and an end time of 9 AM (col 5). The start time (col 4) is set to the value of reference time point prior to the execution of the run (shown in col 1) and the end time (col 5) is set to the execution time of the run. The execution of run #3 is determined to be a success (as shown in col 6), and thus search results are output for the run (as indicated in col 7) and the reference time point updated to 9 AM (as shown in col 8). The search query execution for run #3 can be executed as a single search query over time period 8 to 9 AM (if the backfill type is specified as "time_whole"), or as two search query executions with one over time period 8 to 8:30 am, and the other from 8:30 to 9 AM (if the backfill type is specified as "time_interval"), or using other combinations of time ranges as shown in table B below.

TABLE B

Backfill time intervals for executing Run# 3 of search query

| Value of RTP prior to execution (col 1) | Run #3 (col 2) | Search Query Execution time (col 3) | Start Time (col 4) | End Time (col 5) | Success/ Fail (col 6) | Result Output? (col 7) | Value of RTP after execution (col 8) |
|---|---|---|---|---|---|---|---|
| 8 AM | #3B | 9 AM | 8 AM | 8.30 AM | Success | Yes | 8.30 AM |
| 8.30 AM | #3N | 9:00 AM | 8.30 AM | 9:00 AM | Success | Yes | 9 AM |

As shown in the example depicted in Table B, the time period for the search query run (run #3) may include not only the time period (8.30 AM-9.00 AM) that would typically be included for that particular search query run but also a "backfill" time period (8.00 AM-8.30 AM) corresponding to a previously failed execution of the search query. When a search query with the backfill time period is executed, in one approach, the execution of the search query can be performed as a single search query execution during a time period (8 AM to 9 AM), covering both the backfill and additional time period as a single time period as shown in table A, if the backfill type is specified as "time_whole." In another approach, the search query execution can be performed in two separate search query executions, one execution (3B) for the backfill time period and another execution (3N) for the additional time period as shown in table B, if the backfill type is specified as "time_interval.".

As previously described, a "backfill type" setting may be used to specify the type of backfill time interval (backfill time period) to be used for executing a search query. For instance, if the backfill type is specified as "time_interval," multiple backfill jobs (in accordance with the cron schedule) may be performed. In this case, the end time is 8:30 AM for the first backfill job and 9:00 AM for the second backfill job. If the backfill type is specified as "whole," one backfill job is performed and the end time of the execution of the search query is 9 AM as expressed in table A.

Returning to the example shown in table A, for run #4, the value of the reference time point prior to the run (col 1) is 9 AM, which is the value of the reference time point after the previous run. Run #4 is executed at 9:30 AM (col 2) and has an associated time period characterized by a start time of 9 AM (col 4) and an end time of 9:30 AM (col 5). The start time (col 4) is set to the value of reference time point prior to the execution of the run (shown in col 1) and the end time (col 5) is set to the execution time of the run. The execution of run #4 is determined to be a failure (as shown in col 6), and thus no search results are output for the run (as indicated in col 7) and the reference time point is not updated and remains the same at 9 AM (as shown in col 8).

For run #5, the value of the reference time point prior to the run (col 1) is 9 AM, which is the value of the reference time point after the previous run. Run #5 is executed at 10 AM (col 2) and has an associated time period characterized by a start time of 9 AM (col 4) and an end time of 10 AM (col 5). The start time (col 4) is set to the value of reference time point prior to the execution of the run (shown in col 1) and the end time (col 5) is set to the execution time of the run. The execution of run #5 is determined to be also a failure (as shown in col 6), and thus no search results are output for the run (as indicated in col 7) and the reference time point is not updated and remains the same at 9 AM (as shown in col 8).

For run #6, the value of the reference time point prior to the run (col 1) is 9 AM, which is the value of the reference time point after the previous run. Run #6 is executed at 10:30 AM (col 2) and has an associated time period characterized by a start time of 9 AM (col 4) and an end time of 10:30 AM (col 5). The start time (col 4) is set to the value of reference time point prior to the execution of the run (shown in col 1) and the end time (col 5) is set to the execution time of the run. The execution of run #6 is determined to be a success (as shown in col 6), and thus search results are output for the run (as indicated in col 7) and the reference time point updated to 10:30 AM (as shown in col 8). The search query execution for run #6 can be executed as a single search query over time period 9 to 10:30 AM, as two search query executions with one over time period 9 to 9:30 am, a second from 9:30 to 10 AM, and a third from 10 to 10:30 AM, or using other combinations of time ranges as shown in table C below

TABLE C

| Backfill time intervals for executing Run# 6 of search query ||||||||
| Value of RTP prior to execution (col 1) | Run #6 (col 2) | Search Query Execution time (col 3) | Start Time (col 4) | End Time (col 5) | Success/ Fail (col 6) | Result Output? (col 7) | Value of RTP after execution (col 8) |
| --- | --- | --- | --- | --- | --- | --- | --- |
| 9 AM | #6B1 | 10.30 AM | 9.00 AM | 9.30 AM | Success | Yes | 9.30 AM |
| 9.30 AM | #6B2 | 10:30 AM | 9.30 AM | 10:00 AM | Success | Yes | 10.00 AM |
| 10.00 AM | #6N | 10.30 AM | 10.00 AM | 10.30 AM | Success | Yes | 10.30 AM |

As shown in the example depicted in Table C, the time period for the search query run (run #6) may include not only the time period (10.00 AM-10.30 AM) that would typically be included for that particular search query run but also two "backfill" time periods (9.00 AM-9.30 AM) and (9.30 AM-10 AM) corresponding to two previously failed executions of the search query.

For run #7, the value of the reference time point prior to the run (col 1) is 10:30 AM, which is the value of the reference time point after the previous run. Run #7 is executed at 11 AM (col 2) and has an associated time period characterized by a start time of 10:30 AM (col 4) and an end time of 11 AM (col 5). The start time (col 4) is set to the value of reference time point prior to the execution of the run (shown in col 1) and the end time (col 5) is set to the execution time of the run. The execution of run #7 is determined to be a success (as shown in col 6), and thus search results are output for the run (as indicated in col 7) and the reference time point updated to 11 AM (as shown in col 8), which can then be used for the next run.

As shown in the example depicted in Table A and described above, when a search query execution is unsuccessful, no search results are output and the reference time point value is also not updated. The time period for the next search query run includes not only the time period that would typically be included for that particular search query run but also a "backfill" time period corresponding to a previously failed execution of the search query. When a search query with the backfill time is executed, in one approach, the search subsystem 512 may be configured to execute a first sub-query of the search query for the backfill time period and execute a second sub-query for the additional time period. In another approach, the search subsystem 110 may be configured to execute the search query as a single search query covering both the backfill and additional time periods as a single time period.

It is to be noted that in the example in Table A, two consecutive runs (run #4 and run #5) failed and the reference time point was not updated. As a result, the time period that is computed for run #6 included the time period for run #4, the time period for run #5, and the additional time period for run #6. In certain implementations, the maximum number of time periods to be re-scheduled for a backfill may be specified by a user at the time of setting up the scheduled search job.

In certain approaches, the search subsystem 512 may determine whether to execute the next search query run as a single search query covering both the backfill and additional time periods in a single time period. For instance, if the search query queries event data that represent a streaming search, the search subsystem 110 may determine that the next search query run can be executed as a single search query covering the second time period (i.e., covering both the backfill and additional time periods) as a single time period. This is at least because the search results of a streaming search typically return the streams of raw events without performing additional aggregation. If the search query queries events that represent a reporting or a non-streaming search, the search subsystem may determine that the next search query run can be executed in multiple time intervals i.e., during the backfill time period and during the additional time period. This is at least because, since the search results of a reporting or a non-streaming search may typically return statistical aggregations of raw events, the execution of a reporting search cannot be performed in a single time interval because it contains the statistical information over the different time periods that match the periodicity of executing the search query. In certain examples, the type of the search query and the type of the execution to be performed (for e.g., in a single backfill time interval or in multiple backfill time intervals) for a search query may be specified by a user via various settings in the configuration file associated with the search query as further described in detail below.

The processing performed in blocks 617-624 for the next search query run is then performed in a manner similar to the processing performed for the first search query run. For instance, if the next search query run is determined to be successful, the search results monitoring subsystem 518 updates the reference time information to a time point that corresponds to the end time of the time period and the search results output subsystem 520 outputs the search results. If the next search query run is not determined to be successful, the search results monitoring subsystem 518 does not update the reference time information and the search results output subsystem 520 does not output any search query results including any partial results obtained from executing the search query.

In certain examples, the units of indexed time or timestamp information used to compute the reference time information for a search query as previously described is typically measured in "seconds" and many events can be stamped at the same time point. A measurement of indexed time or timestamps in sub-seconds is possible, but costly in terms of performing both indexing and searching operations. Additionally, the indexed time or timestamp may be late as compared to the current clock. An event that arrives late is associated with an old timestamp. To address the above limitations and to facilitate the accurate computation of the reference time information for a search query (using either the indexed time or timestamp information as described above), in certain examples, the scheduler 504 may be configured to compute a "lag time" to be applied to a search query. In certain examples, the lag time may be computed as part of the processing performed in block 610 while computing a time period for executing the search query. The lag time takes into consideration late coming events and is used to delay the search time period (window) of indexed events by a certain number of seconds. The lag time represents the latency of search results that is acceptable to a user of the system 102 and may be user-configurable. The lag time is a setting that can be specified by the user to take into consideration event loss due to late arrivals. For example, the user may set the lag time to be used at the time of specifying the search properties for the search (e.g., via the search query configuration file 502). In one implementation, when not specifically set by the user, the "lag time" is pre-configured/defaulted to a value of 60 seconds. This assumes that all events indexed 60 seconds earlier from the current time are written into disk and completely available for searching. However, defining a certain lag time for a search query comes at a cost of delayed search results that do not include any written events timestamped within 60 seconds. For instance, as a result of applying a lag time of 60 seconds, for the example shown in Table A, an execution time of 8.00 AM of the search query would be delayed by 60 seconds to 8.01 AM. As another example, the start time of the search query can be set to 7.59 AM while not changing the execution time (i.e., 8.00 AM) of the search query. A proper value of lag time can reduce the impact on this search latency. With the help of lag time, the scheduler 104 can calculate the exact reference time information to be associated with the search query prior to its execution.

As previously described, configuration information 502 associated with a search job may be stored in a search job configuration file. This configuration information may include, but is not limited to, information related to the periodicity of executing the search query, reference time information for the search query, the scheduled execution time of the search query, search criteria specified by the search query, and other search settings specified for the search query. An example search job configuration file is shown below showing various search settings that may be specified for a search job.

```
# example of a durable search
schedule interval = */5 * * * *
disabled = 0 # false
dispatch.earliest_time = -10 m@m
dispatch.latest_time = now
enableSched = 1 # true
# reference time information to track the time type if the job is durable
# _time:      track event time
# _indextime: track indexed time
# none:       not durable
durable.track_time_type = [ _indextime | _time | none]
# lag time
# 0: no lag
# >0: time delay in seconds
durable.lag_time = 10
# backfill type to indicate the backfill time window of failed jobs
#      auto: let scheduler decide
#      time_whole: backfill the whole period of failed jobs, no reschedule
#   time_interval: backfill per cron interval, leading to multiple reschedules
durable.backfill_type = time_interval | time_whole | auto
# NEW: limit the number of backfill re-schedules
#      0: no limit
#      >0: the maximum number of cron intervals
durable.max_backfill_intervals = 100
```

Example Configuration Settings in a Configuration File Associated with a Search Query The configuration settings in the example shown above indicate that the search query is configured to execute periodically in a schedule interval (also referred to herein as a cron schedule) defined by a "dispatch.earliest time" (start time) and a "dispatch.latest time" (end time). The configuration setting "durable.track time type" indicates that the search query is a durable search query. The configuration setting "durable.track time type" may be used to derive the reference time information for the search query based on the timestamp information or the indexed time as described above. The "durable.lag time" setting indicates that a lag time (e.g., 10 seconds) is specified for the search query. The "durable.backfill_type" setting specifies the type of the backfill time interval to be determined for executing the search query.

As previously described, when a search query fails, the reference time information stays at the time of the last successful search. At the next run, the scheduler uses the saved reference time information to dispatch a new run of the search query. If it is successful, the reference time information moves forward. For previous failed searches, a type of backfill time interval (for e.g., a single backfill time interval or multiple backfill time intervals) is determined to execute the search query according to the nature/type of search query (i.e., a streaming or a non-streaming search query). The configuration file shown in the example above indicates three types of settings that may be specified for determining the type of backfill time interval for executing a next run of a search query. In certain examples, the "durable.backfill_type" has three values, "time interval", "time_whole" and "auto."

In certain examples, if the "durable.backfill_type=auto," the scheduler 504 determines the nature of search job, streaming or non-streaming, after inspecting the search query and automatically decides the backfill type, "time_interval" or "time_whole." For a streaming search, the search results return the streams of raw events, without additional aggregation. The backfill of a streaming search can thus be performed in a single backfill time interval ("time_whole") that has a time interval defined between the time point indicated by the reference time information to the current scheduled execution time of the search query. For a reporting or non-streaming search, the search results return statistical aggregations of raw events. The backfill of a reporting search cannot be done in a single time interval because it contains the statistics over a certain period matching the cron schedule. For this type of search, the scheduler schedules a new time interval for every failed cron interval using the "durable.backfill_type="time_interval" setting. The "durable.max_backfill_intervals" specifies the maximum number of cron schedule intervals to be rescheduled for a backfill. In a certain implementation, the backfill has a limit setting that is based on the maximum number of cron intervals to be backfilled. If the limit is 100, the time frame to backfill is 100 multiplied by the cron interval. The search settings depicted in the example above are not intended to be limiting in any manner. In alternate implementations, the configuration file may specify additional settings and/or a different set of settings for a search query.

Figure 7:
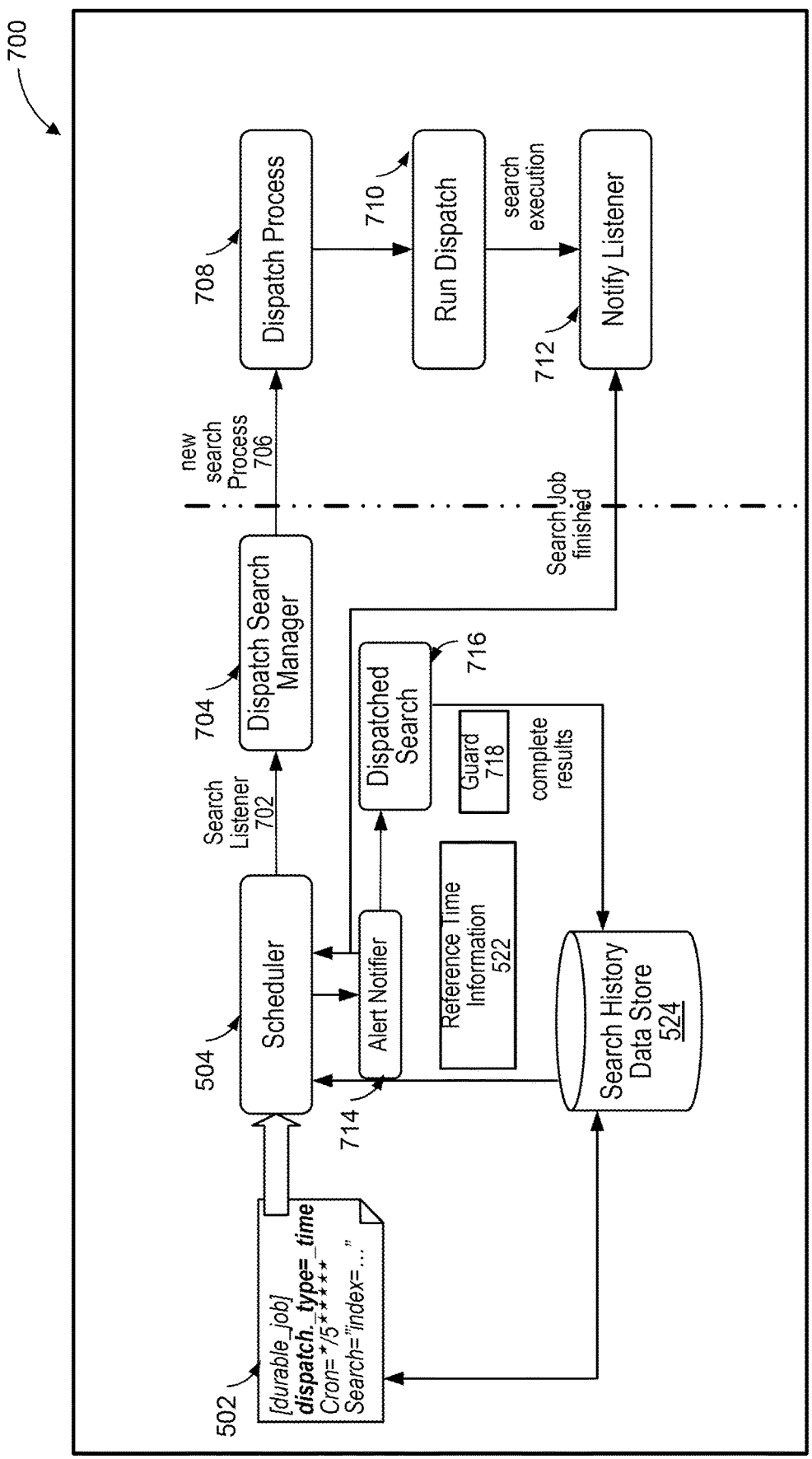
FIG. 7 is an architecture that may be used to implement the improved and reliable query system in certain implementations.

FIG. 7 is an architecture that may be used to implement the improved and reliable query system in certain implementations. The various components of the subsystems of the query system may be implemented using software (e.g., code, instructions, program) executed by one or more processing units (e.g., processors, cores) of a computing system, hardware, or combinations thereof. Computing environment 700 depicted in FIG. 7 is merely an example and is not intended to unduly limit the scope of claimed embodiments. One of ordinary skill in the art would recognize many possible variations, alternatives, and modifications. For example, in some implementations, the computing environment of the query system 114 can be implemented using more or fewer components than those shown in FIG. 7, may combine two or more components, or may have a different configuration or arrangement of components.

In the example depicted in FIG. 7, the scheduler 504 determines when a search query is to be executed based upon configuration information 502, which may indicate information regarding the periodicity of executing the search query. The scheduler 504 uses the configuration information 502 to determine when the search query is to be executed. The scheduler 504 then prepares the search query for execution. As part of this preparation, the scheduler 504 may determine a time when the search query is to be executed. As previously described, the scheduler 504 may also determine a time period for the search query, where the time period identifies a range or window of time indicative of events that are to be searched by the search query. The scheduler 504 then dispatches the search query for execution to a Dispatch Search Manager 704. In a certain implementation, the Dispatch Search Manager 704 may be a component implemented by the search head (508) within the search subsystem (512) that is configured to receive the search query and identify a set of one or more search peers (e.g., 510A-510N) that are available for executing the search query. In certain examples, the scheduler 504 may add a search listener thread 702 prior to dispatching the search query to the Dispatch Search Manager 704. The Dispatch Search Manager 704 creates a new search process or thread 706 and comminutes with a Dispatch Process Component 708 to distribute the execution of the search query to one or more search peers.

In certain implementations, a Run Dispatch Component 710 in the search peer executes its respective portion of the search query and communicates its results of its portion of the search query to a Notify Listener Component 712 which, in certain examples, may be implemented by the search head 508. The Notify Listener Component 712 notifies the scheduler 504 when the search query finishes execution. In order to verify that the search query executed successfully, in certain examples, and as shown in FIG. 7, the scheduler 504 invokes an Alert Notifier Component 714 that, in turn, communicates with a Dispatched Search Component 716 to process the dispatched job (i.e., the search query). The Dispatched Search Component 716 verifies whether the execution of the search query completed successfully. If the search query completed successfully, a durable search Guard process 718 implemented by the Dispatched Search Component 716 moves/updates the reference time information to a time point that corresponds to the last event that was successfully searched by the search query during its time period and stores the updated reference time information in the search history data store 120. The Dispatched Search Component 716 updates the search history data store 524 with the reference time information and other information associated with the search query such as its scheduled execution time, time interval for execution and so on. When the scheduler 504 loads the configuration information for the search query, it reads the job history and applies the updated reference time information to determine the start time of execution of the next run of the search query.

As described above, a system administrator or a user may configure parameters for a search job, such as the periodicity during which the search query is to be executed, information indicative of whether the search job is durable or not, information indicating whether the reference time information refers to event time or indexed time, and other parameters related to execution of the search query. In certain implementations, the data intake and query system 102 may provide various interfaces such as graphical user interfaces (GUIs), command line interfaces (CLIs), etc. FIG. 8 illustrates an example of a graphical user interface (GUI) 800 that the data intake and query system 102 may provide to enable users to configure a search job. In the example depicted in FIG. 8, the GUI 800 provides a title field 802 where a user can enter a title for the search job. As shown in FIG. 8, the title "Durable Job A" has been entered. A description field 804 is provided where the user can input a description for the durable search query. A search field 806 is provided where the user can input search criteria for to be used for each search query corresponding to the search job. In some examples, the search criteria and query can be formulated as a sequence of SPL commands. Some or all of the SPL commands in the sequence of SPL commands can be separated from one another by a pipe symbol "|."

The GUI 800 additionally displays fields for entering values related to various search settings that may be specified for the search job and associated search queries. These fields, include, but are not limited to, an earliest time field 808 and a latest time field 810 for indicating how the time period is computed for each run. For example, the "earliest time" set to "-10m@m" indicates that the earliest time is set to 10 minutes prior to execution time and the "latest time" set to "now" indicates the time of execution of the search query. A durable search selection box 812 which when selected or set indicates that the search query corresponding to the search job are to be treated as a durable search query and the reference time information is to be used for computing the time period for each run of the search query, and to be not treated as a durable search query (i.e., reference time information is not used) when not set; a track time type field 814 for providing whether the reference time information refers to event time or indexed time; a track lag time field 816 for specifying the lag time to be used; a backfill type selection options 818 for specifying the type of backfill time interval (auto, whole time or cron interval) during which the search query is executed; and a max backfill intervals field for specifying the maximum number of cron schedule intervals to be re-scheduled for a backfill. As previously described, the search query run can be performed as a single search query covering both the backfill and additional time periods in a single time period or executed in multiple time intervals (cron intervals), during the backfill time period and the additional time period. The max backfill intervals specifies the maximum number of cron schedule intervals to be re-scheduled for a backfill. The fields depicted in the GUI 800 are meant as examples and are not intended to be limiting in any manner. In alternate implementations, the GUI 800 may provide additional fields and/or a different set of fields to enable a user to create/edit search queries.

Figure 9:
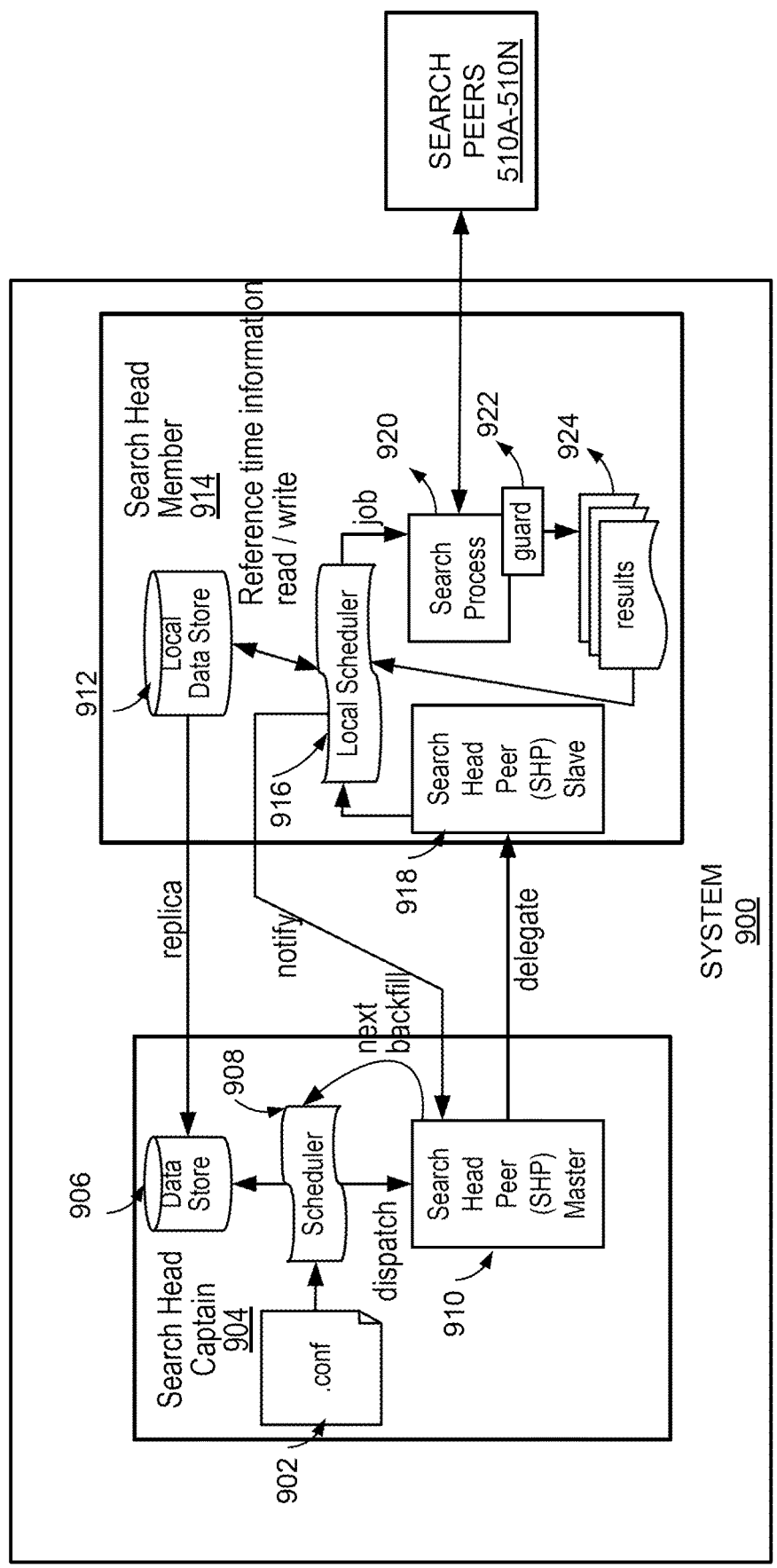
FIG. 9 depicts an implementation of a search subsystem, which may be part of a query system of a data intake and query system, and used to execute search queries according certain implementations.

FIG. 9 depicts an implementation of a search subsystem, which may be part of a query system of a data intake and query system, and used to execute a search query according to certain implementations. For example, the search subsystem 512 depicted in FIG. 5 may be implemented as a system 900 as shown in FIG. 9. The system 900 and its components may be implemented using software (e.g., code, instructions, program) executed by one or more processing units (e.g., processors, cores) of a computing system, hardware, or combinations thereof. The system 900 depicted in FIG. 9 is merely an example and is not intended to unduly limit the scope of claimed embodiments. One of ordinary skill in the art would recognize many possible variations, alternatives, and modifications. For example, in some implementations, the system 900 can be implemented using more or fewer subsystems than those shown in FIG. 9, may combine two or more subsystems, or may have a different configuration or arrangement of subsystems.

As shown in FIG. 9, the search subsystem 512 comprises a search head captain 904 and a search head member 914. In a certain implementation, the search head captain and the search head member can be implemented as two network-connected servers/systems. The search head captain 904 reads configuration information 902 associated with the search query and schedules (using a scheduler 908) the search query for execution by dispatching it to a search head peer (SHP) master 904. The configuration information 902 and the scheduler 908 may be similar to the configuration information (502) and the scheduler (504) described in FIG. 5. The SHP master 910 identifies a SHP slave member 918 within a search head member (peer) 914 and delegates the execution of the search query to the SHP slave member 918. The SHP slave member 918 calls a local scheduler 916 to populate the scheduled search job that identifies the schedule of execution of the search query by reading the saved search history stored locally in the local data store 912.

The local scheduler 916 executes the job comprising the search query using a search process 920 and if the search query completed successfully, a durable search guard 922 implemented by the search process 920 moves/updates the reference time information to a time point that corresponds to the last event that was successfully searched by the search query during its time period. If the search query was not executed successfully, the search guard 922 does not move/update the reference time information. The search process 920 then communicates the results 924 of execution of the search query to the local scheduler 916. The local scheduler 916 writes the updated reference time information to the local data store 912. In certain examples, the local data store 912 transmits a replica of the stored updated reference information to the data store 906 in the search head captain 904 and concurrently notifies the SHP master 910 of the status of the execution of the search query. If the SHP master 910 determines that the execution of the search query did not complete successfully, it calls the scheduler 908 to re-schedule a backfill job that determines a backfill time interval for executing the next run of the search query (i.e., a subsequent execution of the search query).

The present disclosure describes techniques for improving the reliability of searches performed by the data intake and query system and, in particular, for searches that are scheduled to execute periodically. This is achieved by enabling the data intake and query system to accurately track event data that was successfully searched and event data that was not successfully searched. The data intake and query system automatically maintains reference time information indicative of which events were successfully searched, and this reference time information is used to determine a time period to be used for a next execution of the search query, where the start time of the time period is based upon the reference time point indicated by the reference time information. This ensures reliable search results as all events are properly searched without any event loss and event duplicates. Further, search results may be output to the user or consumer only when the search query is successful. Any partial results may not be output. This further ensures that the user or consumer only receives reliable results. This also prevents duplicate results from being output to the user. This guarantees that the data intake and query system reliably delivers to the user every single event that meets the search filters specified by the search query, thus making the searches very durable.

In certain examples, the data intake and query system executes a search query at a first execution time for querying events having associated time stamps within a first time period. The first time period is characterized by a first start time and a first end time. The first start time is computed based upon a time indicated by reference time information stored prior to execution of the search query. The system then determines whether execution of the search query at a first execution time completed successfully based upon a first search result obtained from executing the search query at a first execution time. Responsive to determining that execution of the search query at a first execution time did not complete successfully, the data intake and query system computes, for an execution of the search query at a second execution time after the first execution time, a second time period based upon the reference time information. In certain examples, the second time period is characterized by a second start time and a second end time. The search query executed at the second execution time is configured to query events with associated timestamps that fall within the second time period. In certain implementations, the second time period includes the first time period and an additional time period.

In certain examples, the data intake and query system updates the reference time information to a time point based upon the first end time responsive to determining that execution of the search query at the first execution time completed successfully. In certain examples, the second time period for the search query executed at the second execution time is computed based upon the time point indicated by the reference time information.

In certain examples, the data intake and query system executes the search query at the second execution time. The execution of the search query may include executing a first sub-query for the first time period and executing a second sub-query for the additional time period In certain examples, the first sub-query and the second sub-query may refer to two separate executions of the search query. In other examples, the second search query is executed as a single search query covering the second time period.

In certain examples, the data intake and query system determines that the execution of the search query at the first execution time did not complete successfully as follows. The system determines that for events with associated timestamps within the first time period, at least a set of one or more the events could not be queried as a result of executing the first search query. Responsive to determining that at least the set of one or more events could not be queried as a result of executing the search query at the first execution time, the system determines that the execution of the search query at the first execution time did not complete successfully.

In certain examples, determining that the execution of the search query at the first execution time did not complete successfully comprises determining, by the data intake and query system, that a first partial result is obtained from applying the search query to a first set of events. The first set of events include events with associated time stamps within the first time period. The system then determines that a result is not obtained from applying the search query to a second set of events. The second set of events include events with associated time stamps within the first time period. Responsive to determining that the result is not obtained from applying the search query to the second set of events, the system determines that the execution of the search query did not complete successfully. In certain examples, the first partial result is not output based upon determining that the execution of the search query did not complete successfully.

In certain examples, the execution of the search query at the second execution time comprises executing, by the system, a set of sub-queries. The system then determines that the execution of the search query at the first execution time did not complete successfully by determining that a result is not obtained for at least one sub-query in the set of sub-queries. The system then determines that the execution of the search query at the first execution time did not complete successfully responsive to determining that the result is not obtained for at least one sub-query in the set of sub-queries.

In certain examples, the time indicated by reference time information corresponds to an event time associated with an event queried by the search query at the first execution time or the search query at the second execution time where the event time identifies the time when the event was received by the data intake and query system. In other examples, the time indicated by reference time information corresponds to an indexed time associated with an event queried by the search query at the first execution time or the search query at the second execution time, where the indexed time identifies the time the event was indexed by the data intake and query system.

In certain examples, the system determines a lag time associated with the events queried by the search query at the first execution time or the search query at the second execution time. The lag time is indicative of an arrival latency associated with the events. In a certain implementation, the start time of the first time period is computed based on the lag time.

In certain examples, the search query at the first execution time and the search query at the second execution time are executed as part of a scheduled search job that is configured to identify a schedule for executing the search query at the first execution time and the search query at the second execution time.

6.0. Terminology

Computer programs typically comprise one or more instructions set at various times in various memory devices of a computing device, which, when read and executed by at least one processor, will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Furthermore, use of "e.g.," is to be interpreted as providing a non-limiting example and does not imply that two things are identical or necessarily equate to each other.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further implementations of the disclosure. These and other changes can be made to the disclosure in light of the above Detailed Description. While the above description describes certain examples of the disclosure, and describes the best mode contemplated, no matter how detailed the above appears in text, the disclosure can be practiced in many ways. Details of the system may vary considerably in its specific implementation, while still being encompassed by the disclosure disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific examples disclosed in the specification, unless the above Detailed Description section explicitly defines such terms. Accordingly, the actual scope of the disclosure encompasses not only the disclosed examples, but also all equivalent ways of practicing or implementing the disclosure under the claims.

To reduce the number of claims, certain aspects of the disclosure are presented below in certain claim forms, but the applicant contemplates other aspects of the disclosure in any number of claim forms. For example, while only one aspect of the disclosure is recited as a means-plus-function claim under 35 U.S.C. sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computer-implemented method, comprising:
   storing, by a data intake and query system, events having associated timestamps in a distributed manner across a plurality of indexers;
   executing, by the data intake and query system, a search query at a first execution time for querying the events within a first time period, the first time period characterized by a first start time and a first end time, wherein the first start time is computed based upon a time indicated by reference time information stored prior to the first execution time, wherein the reference time information indicates event data that has been successfully searched by the search query, wherein events with associated timestamps prior to the time indicated by the reference time information are considered successfully searched;
   determining, by the data intake and query system, whether execution of the search query at the first execution time completed successfully based upon a first search result obtained from executing the search query at the first execution time;
   responsive to determining that execution of the search query at the first execution time did not complete successfully, computing, by the data intake and query system and for an execution of the search query at a second execution time after the first execution time, a second time period based upon the reference time information, the second time period characterized by a second start time and a second end time, and wherein the second time period includes the first time period and an additional time period; and
   executing, by the data intake and query system, the search at the second execution time to query events with associated timestamps that fall within the second time period.

2. The method of claim 1, further comprising determining that the execution of the search query at the first execution time completed successfully and responsive to the determining, updating, by the data intake and query system, the reference time information to a time point based upon the first end time.

3. The method of claim 1, wherein computing the second time period comprises computing the second start time based upon the time point indicated by the reference time information.

4. The method of claim 1 wherein executing the search query at the second execution time comprises:
   executing a first sub-query for the first time period; and
   executing a second sub-query for the additional time period.

5. The method of claim 1 wherein executing the search query at the second execution time comprises executing a single search query covering the second time period.

6. The method of claim 1, wherein determining that the execution of the search query at the first execution time did not complete successfully comprises:
   determining that, for a plurality of events comprising events with associated timestamps within the first time period, at least a set of one or more events in the plurality of events could not be queried as a result of executing the search query at the first execution time; and
   responsive to determining that at least the set of one or more events in the plurality of events could not be queried as a result of executing the search query at the first execution time, determining that the execution of the search query at the first execution time did not complete successfully.

7. The method of claim 1, wherein determining that the execution of the search query at the first execution time did not complete successfully comprises:
   determining that a first partial result is obtained from applying the search query at the first execution time to a first plurality of events, the first plurality of events comprising events with associated time stamps within the first time period;
   determining that a result is not obtained from applying the search query at the first execution time to a second plurality of events, the second plurality of events comprising events with associated time stamps within the first time period; and
   responsive to determining that the result is not obtained from applying the search query at the first execution time to the second plurality of events, determining that the execution of the search query at the first execution time did not complete successfully.

8. The method of claim 7, wherein the first partial result is not output based upon determining that the execution of the search query at the first execution time did not complete successfully.

9. The method of claim 1, wherein:
   executing the search query at the second execution time comprises executing a plurality of sub-queries; and
   determining that the execution of the search query at the first execution time did not complete successfully comprises:
      determining that a result is not obtained for at least one sub-query in the plurality of sub-queries; and
      responsive to determining that the result is not obtained for at least one sub-query in the plurality of sub-queries, determining that that the execution of the search query at the first execution time did not complete successfully.

10. The method of claim 1, wherein the time indicated by reference time information corresponds to an event time associated with an event queried by the search query at the first execution time or the search query at the second execution time, wherein the event time identifies the time when the event was received by the data intake and query system.

11. The method of claim 1, wherein the time indicated by reference time information corresponds to an indexed time associated with an event queried by the search query at the first execution time or the search query at the second execution time, wherein the indexed time identifies the time the event was indexed by the data intake and query system.

12. The method of claim 1, further comprising:
determining, by the data intake and query system, a lag time associated with the events queried by the search query at the first execution time or the search query at the second execution time, wherein the lag time is indicative of an arrival latency associated with the events and wherein the start time of the first time period is computed based on the lag time.

13. The method of claim 1, wherein the search query at the first execution time and the search query at the second query at the second execution time are executed as part of a scheduled search job that is configured to identify a schedule for executing the search query at the first execution time and the search query at the second execution time.

14. A computing device, comprising:
a processor; and
a non-transitory computer-readable medium having stored thereon instructions that, when executed by the processor, cause the processor to perform operations including:
storing events having associated timestamps in a distributed manner across a plurality of indexers;
executing a search query at a first execution time for querying the events within a first time period, the first time period characterized by a first start time and a first end time, wherein the first start time is computed based upon a time indicated by reference time information stored prior to execution of the search query at the first execution time, wherein the reference time information indicates event data that has been successfully searched by the search query, wherein events with associated timestamps prior to the time indicated by the reference time information are considered successfully searched;
determining whether execution of the search query at the first execution time completed successfully based upon a first search result obtained from executing the search query at the first execution time;
responsive to determining that execution of the search query at the first execution time did not complete successfully, computing for an execution of the search query at a second execution time after the first execution time, a second time period based upon the reference time information, the second time period characterized by a second start time and a second end time, and wherein the second time period includes the first time period and an additional time period; and
executing the search at the second execution time to query events with associated timestamps that fall within the second time period.

15. The computing device of claim 14 further comprising responsive to determining that execution of the search query at the first execution time completed successfully, updating the reference time information to a time point based upon the first end time.

16. The computing device of claim 14, wherein computing the second time period comprises computing the second start time based upon the time point indicated by the reference time information.

17. The computing device of claim 14 wherein executing the search query comprises:
executing a first sub-query for the first time period; and
executing a second sub-query for the additional time period.

18. A non-transitory computer-readable medium having stored thereon instructions that, when executed by one or more processors, cause the one or more processor to perform operations including:
storing events having associated timestamps in a distributed manner across a plurality of indexers;
executing a search query at a first execution time for querying the events within a first time period, the first time period characterized by a first start time and a first end time, wherein the first start time is computed based upon a time indicated by reference time information stored prior to execution of the search query at the first execution time, wherein the reference time information indicates event data that has been successfully searched by the search query, wherein events with associated timestamps prior to the time indicated by the reference time information are considered successfully searched;
determining whether execution of the search query at the first execution time completed successfully based upon a first search result obtained from executing the search query at the first execution time;
responsive to determining that execution of the search query at the first execution time did not complete successfully, computing for an execution of the search query at a second execution time after the first execution time, a second time period based upon the reference time information, the second time period characterized by a second start time and a second end time, and wherein the second time period includes the first time period and an additional time period; and
executing the search at the second execution time to query events with associated timestamps that fall within the second time period.

19. The non-transitory computer-readable medium of claim 18, wherein determining that the execution of the search query at the first execution time did not complete successfully comprises:
determining that a first partial result is obtained from applying the search query at the first execution time to a first plurality of events, the first plurality of events comprising events with associated time stamps within the first time period;
determining that a result is not obtained from applying the search query at the first execution time to a second plurality of events, the second plurality of events comprising events with associated time stamps within the first time period; and
responsive to determining that the result is not obtained from applying the search query at the first execution time to the second plurality of events, determining that the execution of the search query at the first execution time did not complete successfully.

20. The non-transitory computer-readable medium of claim 19, wherein the first partial result is not output based upon determining that the execution of the search query at the first execution time did not complete successfully.

\* \* \* \* \*